(12) United States Patent
Rawlings et al.

(10) Patent No.: US 6,177,189 B1
(45) Date of Patent: Jan. 23, 2001

(54) APPLIQUÉS PROVIDING CORROSION PROTECTION

(75) Inventors: Diane C. Rawlings, Bellevue; Dennis L. Dull, Sumner, both of WA (US)

(73) Assignee: The Boeing Company, Seattle, WA (US)

(*) Notice: Under 35 U.S.C. 154(b), the term of this patent shall be extended for 0 days.

(21) Appl. No.: 08/994,837

(22) Filed: Dec. 19, 1997

Related U.S. Application Data

(60) Provisional application No. 60/033,635, filed on Dec. 20, 1996.

(51) Int. Cl.[7] .............................. B32B 1/10; B32B 35/00
(52) U.S. Cl. .................................. 428/343; 428/355 AC; 428/421; 428/422; 428/914; 156/71; 156/94; 156/304.3
(58) Field of Search ........................... 156/242, 245, 156/250, 297, 324.4, 71, 304.3, 94; 427/140; 428/421, 422, 355 AC, 343, 914

(56) References Cited

U.S. PATENT DOCUMENTS

| | | |
|---|---|---|
| Re. 36,457 * | 12/1999 | Ellison et al. ..................... 428/421 |
| 3,065,940 | 11/1962 | Eckstein . |
| 3,868,288 | 2/1975 | Ercolano . |
| 3,886,020 | 5/1975 | Shank, Jr. . |
| 4,042,433 | 8/1977 | Hardy et al. . |
| 4,374,687 * | 2/1983 | Yamamoto ........................ 156/71 |
| 4,770,927 * | 9/1988 | Effenberger et al. ............... 428/245 |
| 4,986,496 | 1/1991 | Marentic et al. . |
| 5,008,140 | 4/1991 | Schmertz . |
| 5,035,940 | 7/1991 | Winton et al. . |
| 5,069,403 | 12/1991 | Marentic et al. . |
| 5,106,439 | 4/1992 | Wellings et al. . |
| 5,133,516 | 7/1992 | Marentic et al. . |
| 5,255,352 | 10/1993 | Falk . |
| 5,318,251 | 6/1994 | Bergh . |
| 5,352,565 | 10/1994 | Schroeder . |
| 5,448,687 | 9/1995 | Hoogerhyde et al. . |
| 5,556,491 | 9/1996 | Servanty et al. . |
| 5,660,667 | 8/1997 | Davis . |
| 5,725,947 | 3/1998 | Johannsen et al. . |
| 5,807,628 * | 9/1998 | Mnich et al. ..................... 428/314.2 |
| 5,855,977 * | 1/1999 | Fukushi et al. ................... 428/422 X |

OTHER PUBLICATIONS

"Paintless Aircraft Technology," Aero. Eng'g, Nov. 1997, p. 17.
"Surface Coating," McGraw–Hill Encyclopedia of Sci. & Tech., vol. 18, p. 10 (1992).

* cited by examiner

*Primary Examiner*—Shrive Beck
*Assistant Examiner*—Kirsten A. Crockford
(74) *Attorney, Agent, or Firm*—John C. Hammar

(57) ABSTRACT

Increasingly stringent environmental restrictions make it challenging to apply coatings (i.e., paint) by conventional processes like spray painting because of the volatile solvents and hazardous pigments. The environmental scrutiny is particularly focused upon conventional corrosion protection surface treatments, especially chromated primers and conversion coatings. We apply appliqués to provide a vapor barrier over the substrate to provide corrosion protection. We can make curved appliqués on a family of molds of different Gaussian curvature and thereby avoid making a "splash" mold of the surface of interest to create the appliqués. Using curved appliqués reduces ridges, creases, or gaps that sometimes otherwise occur with attempts to a cover a surface with complex curvature with flat (planar) appliqués.

26 Claims, 28 Drawing Sheets

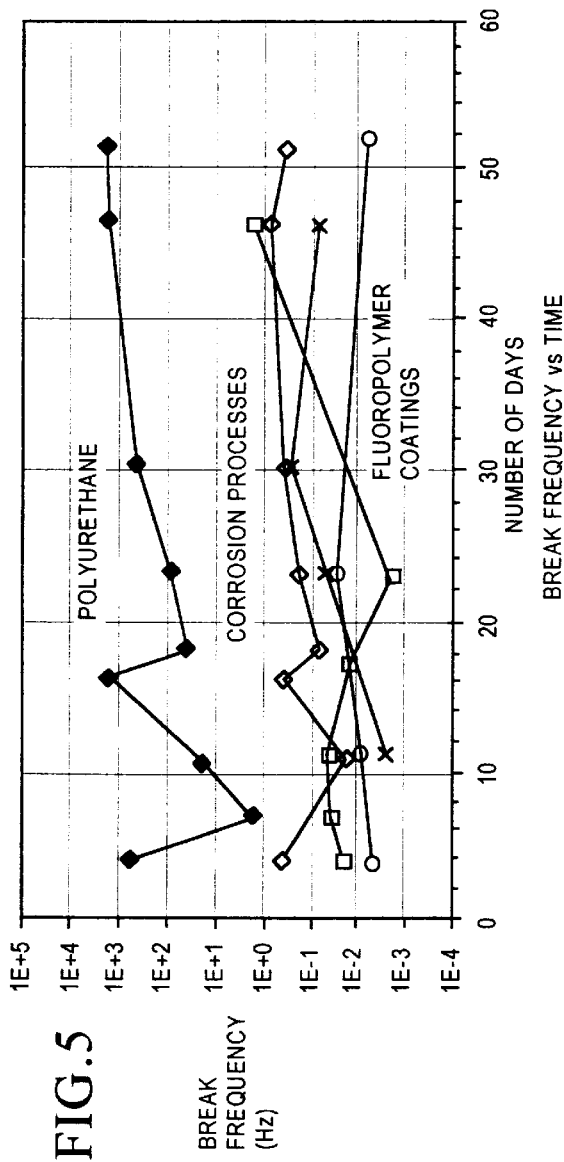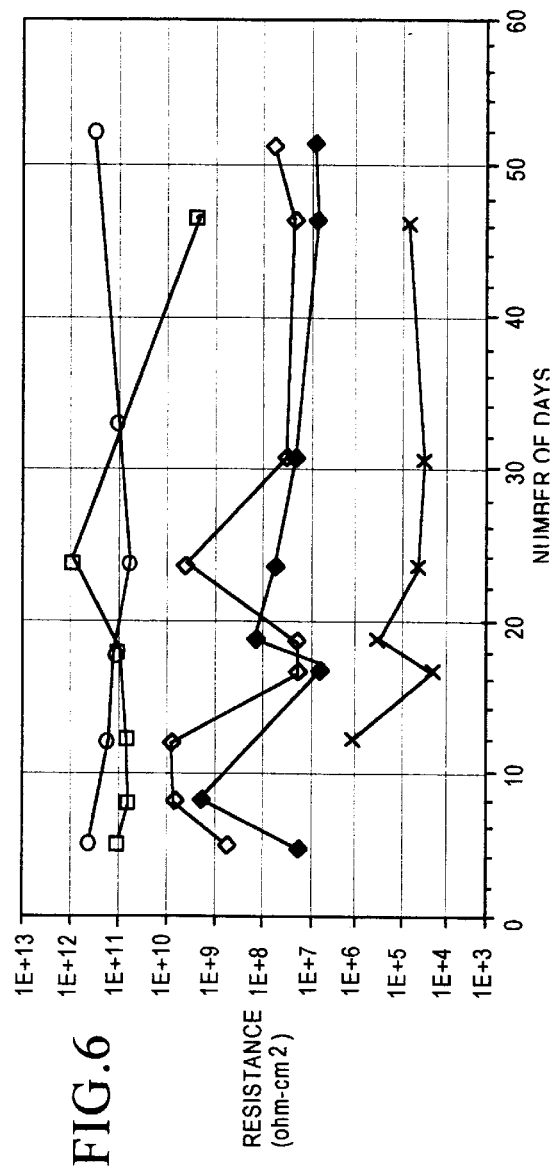

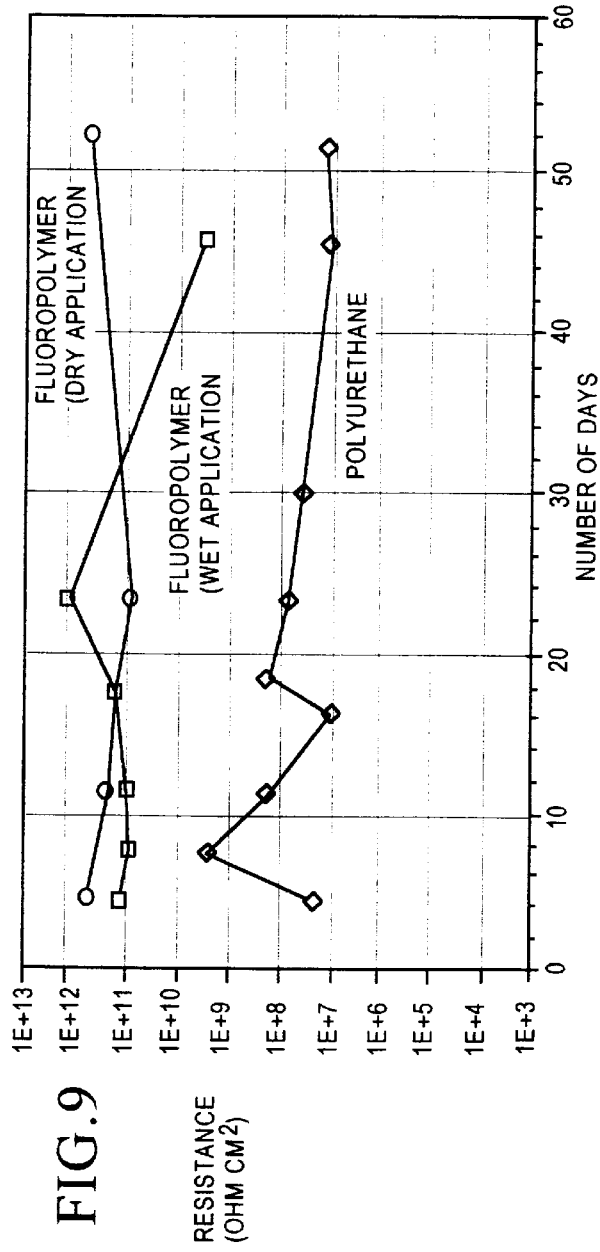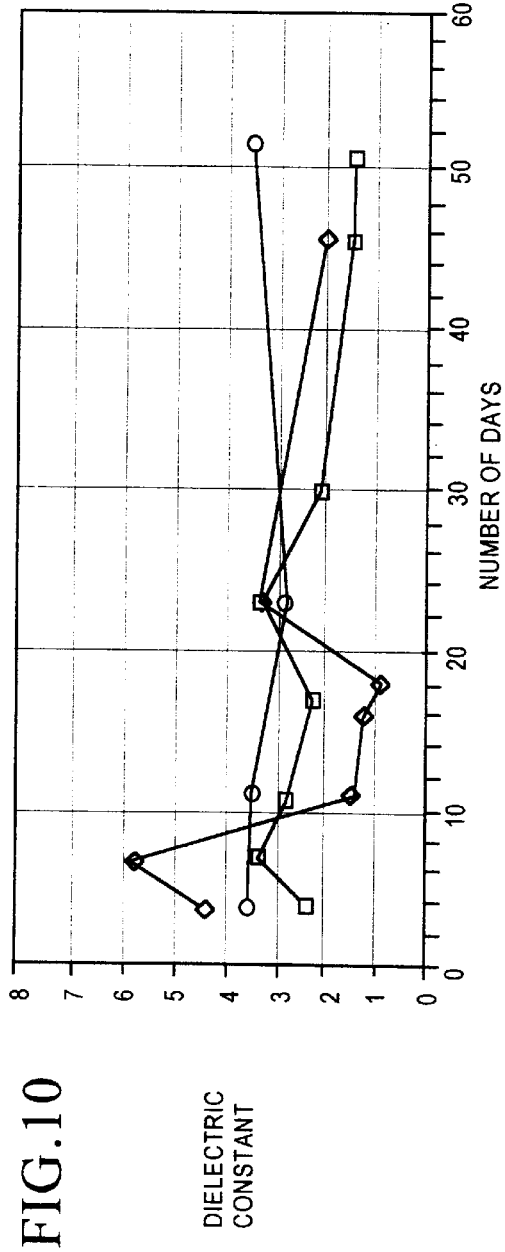
FIG.9
FIG.10

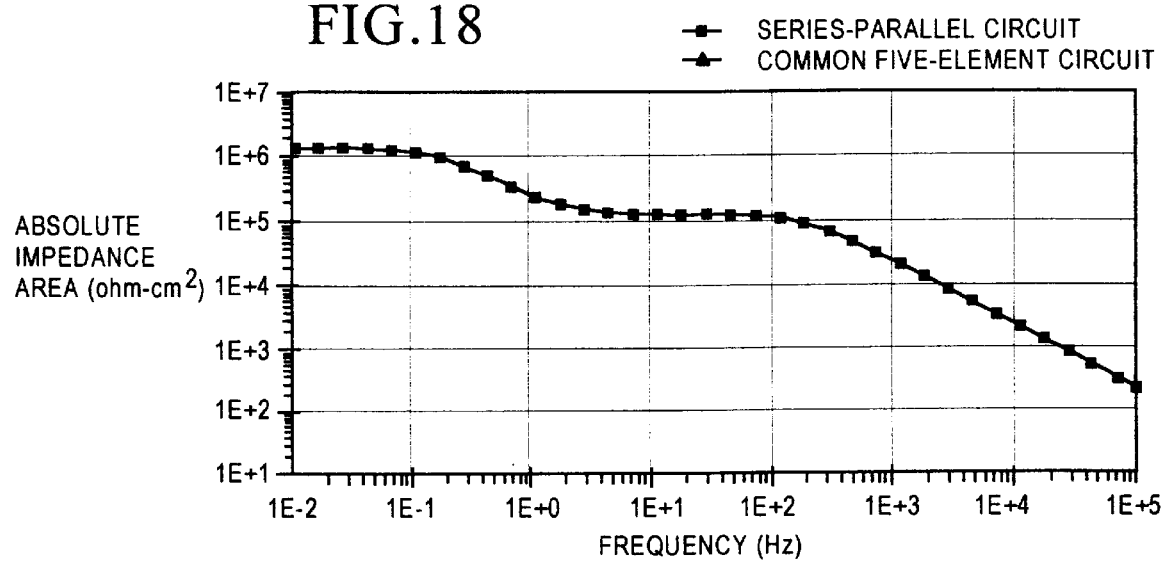
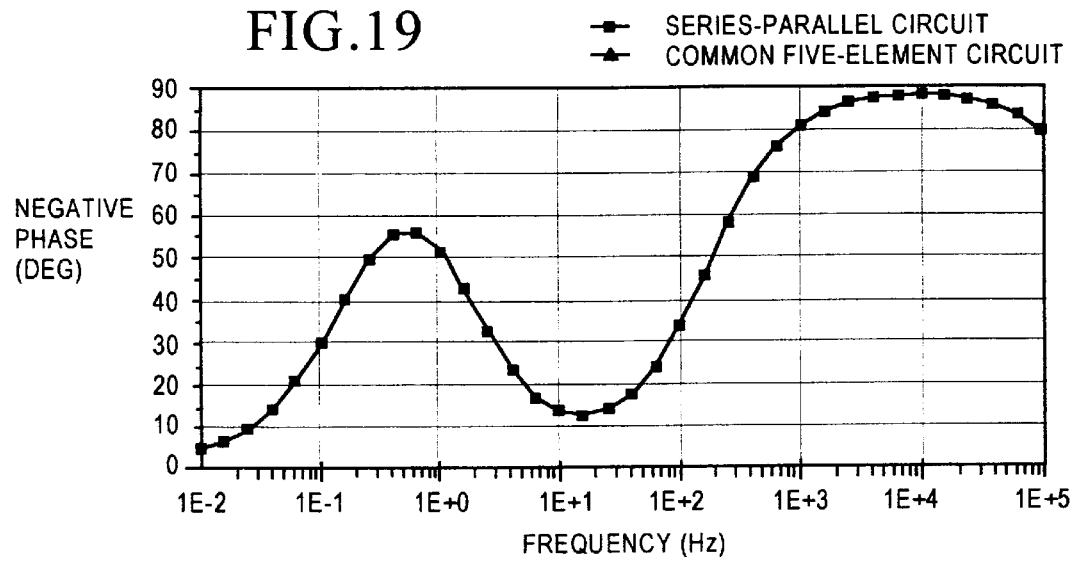

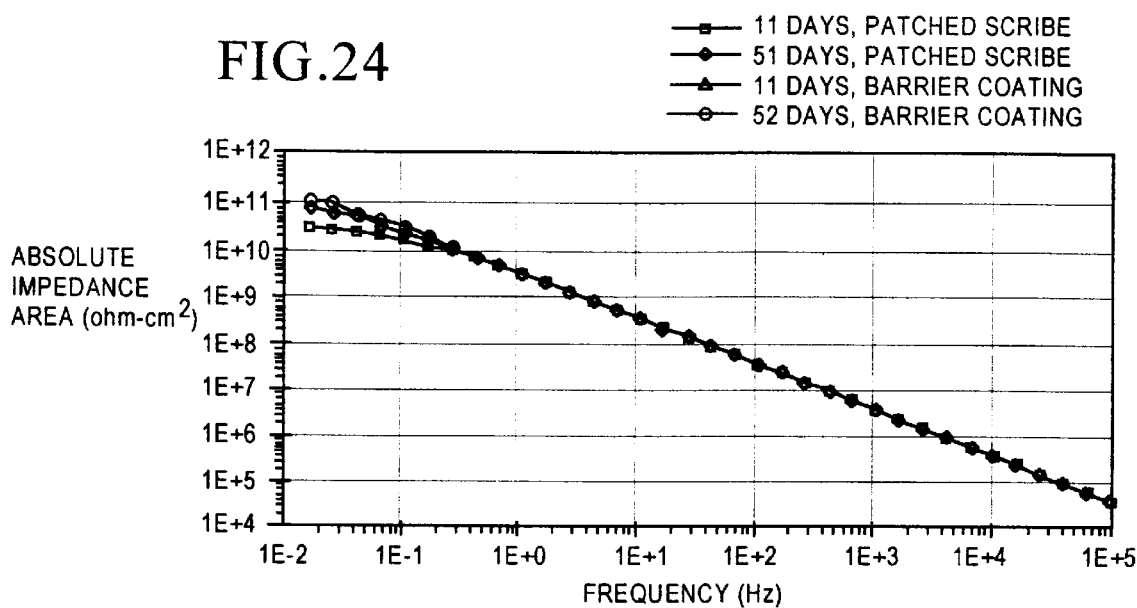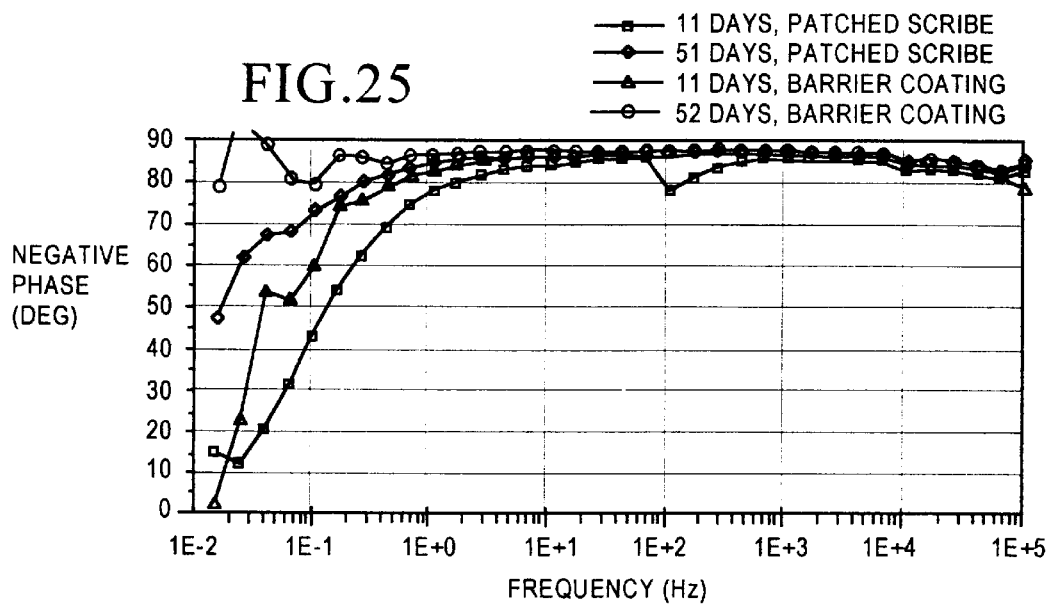

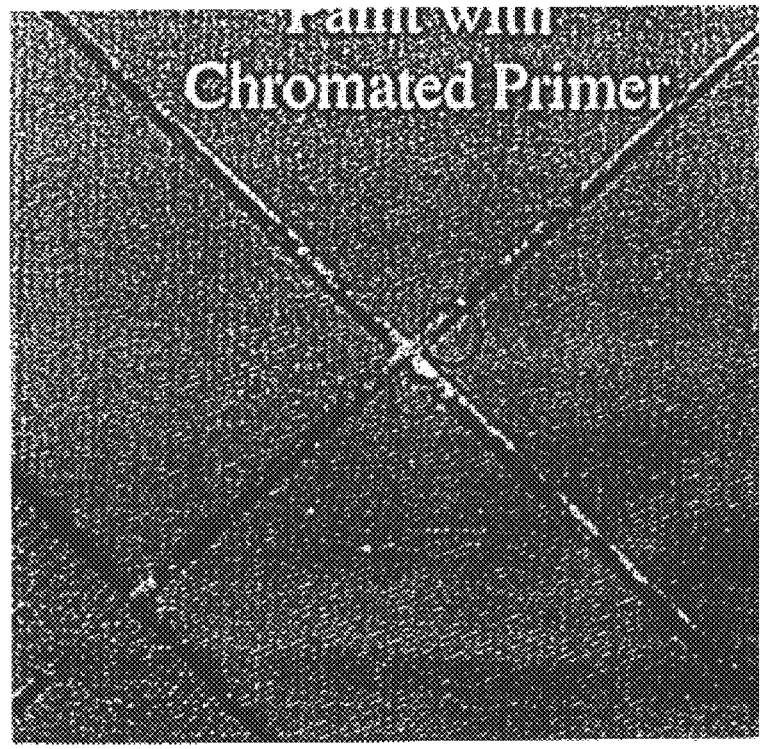
FIG. 38
FIG. 39
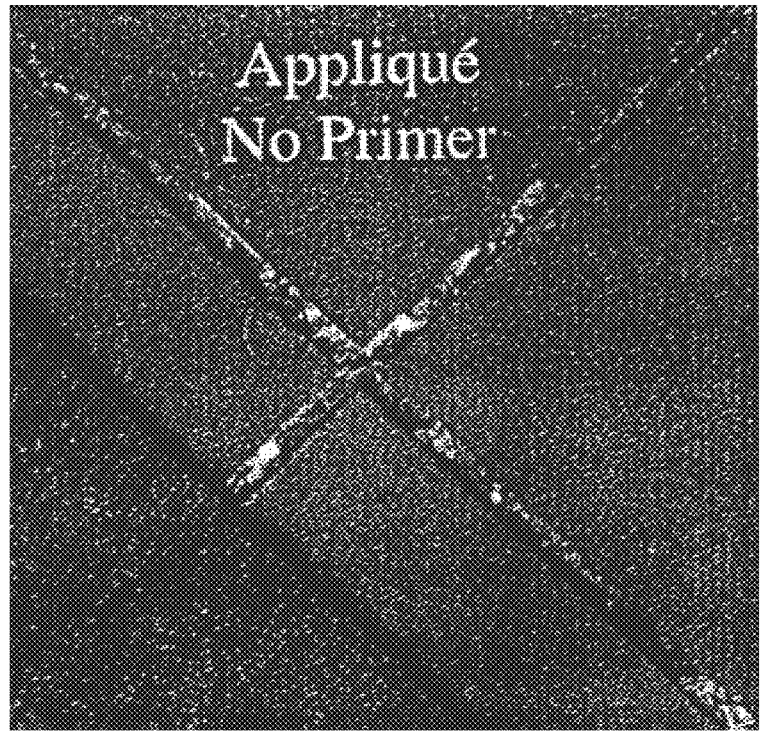

FIG. 42
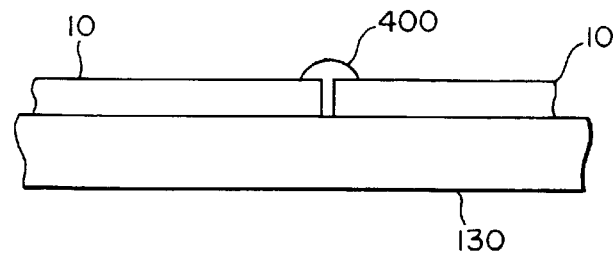
FIG. 43
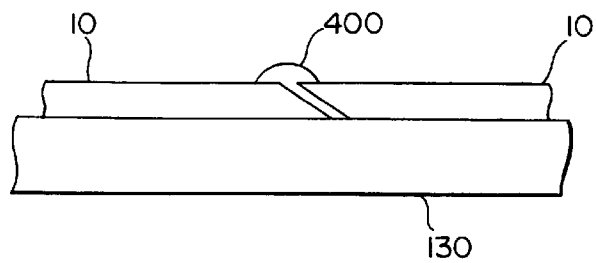
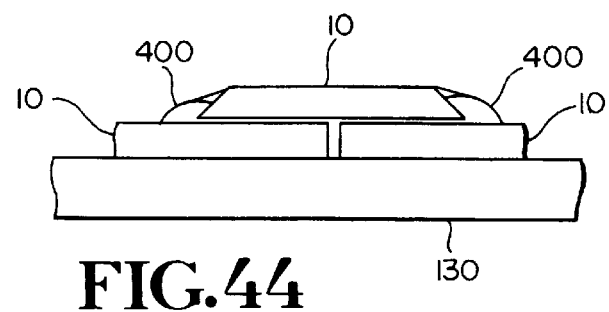
FIG. 44
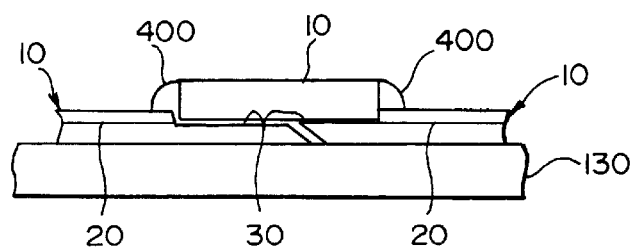
FIG. 45

APPLIQUÉS PROVIDING CORROSION PROTECTION

REFERENCE TO RELATED APPLICATIONS

This application claims the benefit of U.S. Provisional Patent Application No. 60/033,635, filed Dec. 20, 1996.

TECHNICAL FIELD

The present invention relates to paint replacement films, especially corrosion protection surface coatings in the form of appliqués. The appliqués preferably include a protective film, preferably an elastomer, as a topcoat backed with a vapor barrier that is adhered to a substrate, like the exterior of an aircraft.

BACKGROUND ART

Painting has long been the process of choice for applying coatings to surfaces especially those having complex curvature. Painting is generally a controllable, reliable, easy, and versatile process. The paint can include additives to give the surface desired physical properties, such as gloss, color, reflectivity, or combinations thereof. The painting process is well understood and produces quality coatings having uniform properties even when the surface includes complex curvature. Unfortunately, painting is falling under closer environmental scrutiny because they use volatile solvents to carry the pigments or because of the pigments themselves. Therefore, there is a need to replace the painting process with a process that has less environmental impact. Furthermore, while painting is well defined, well understood, and common, it remains an "art" where masters produce better products than novices or apprentices without necessarily being able to account for why or to teach others how.

Painted surfaces sometimes lack the durability that quality-conscious customers demand. The surface must be treated and cleaned prior to applying the paint. The environment surrounding the part must be controlled during the coating application, often requiring a spray booth, Painted coatings are also vulnerable to damage like cracks or scratches. Isolated damage may require the repair of a large area, such as forcing the repainting of an entire panel.

Spraying inherently wastes paint and is unpredictable because of the "art" involved with the application. Improper application cannot be detected until the spraying is complete, then rework to correct a defect usually affects a large area even for a small glitch.

U.S. Pat. No. 4,986,496 by Marentic et al. describes a drag reduction article in the form of a conformable sheet material (a decal) with surface texturing for application to aircraft flow control surfaces to reduce aircraft drag. The material fits on curved surfaces without cracks, bubbles, or wrinkles because of the paint-like properties of the basic carrier film. Marentic's decals are manufactured flat and are stretched to the intended simple curvature. Stretching can be problematic over time if the stretched material shrinks to expose a gap between adjacent decals where weather can attack the decal-surface interface. Stretching generally limits Marentic appliqués to surfaces of slowly changing curvature. We incorporate this patent by reference.

Appliques (i.e. decals) are also described in U.S. Pat. No. 5,660,667 Davis, which we incorporate by reference. Having complex curvature, the appliqués form complete, bubble-free, wrinkleless coverings on surfaces of complex curvature without significant stretching. Davis applies these appliqués by:

(a) analyzing and mapping the Gaussian curvature of the surface to be covered to identify lines of constant Gaussian curvature;

(b) identifying geodesic lines on the surface, such that the lines of constant Gaussian curvature and the geodesics form a mapping grid on the surface;

(c) analyzing the stretchiness needed to blend between appliqués of adjacent areas of different Gaussian curvature;

(d) producing appliqués for each Gaussian curvature using a family of molds;

(e) identifying on the surface the grid made up of the lines of constant Gaussian curvature and intersecting geodesics; and (f) applying appliqués of a particular Gaussian curvature along the matching line of constant Gaussian curvature on the surface to produce a complete, bubble-free, wrinkleless covering on the surface comparable to a conventional painted coating and while minimizing stretching of any appliqué to complete the coating.

Identifying the grid can include physically marking the lines, displaying them with an optical template, or simply defining them in a 3-dimensional digital data model for the surface.

The Davis method recognizes that surfaces having the same Gaussian curvature can be mapped topologically to correspond. If you have a surface of Gaussian curvature 5 $ft^{-2}$, for example, instead of making a "splash" mold of the surface to make appliqués, you mold appliqués to curvature 5 $ft^{-2}$ on a master curvature 5 $ft^{-2}$ mold, which, for example, might be a sphere. Appliqués from the master mold will fit bubble-free and wrinkleless on the actual surface.

Often surfaces must be protected against corrosion. Such protection commonly involves surface treatments or primers (i.e. chromated primers or conversion coatings) that are relatively expensive because of the chemicals involved and the time associated with their application. These traditional coatings are relatively heavy, especially when coupled with other surface coatings that must be applied over the corrosion protection coating to provide color, gloss, enhanced surface durability, abrasion protection, a combination of these attributes, or other attributes. The chemicals used in conventional corrosion protection coatings often are hazardous materials.

Appliqués are of considerable interest today for commercial and military aerospace applications. Lockheed Martin and 3M are conducting flight tests on paintless aircraft technologies. These appliqués (like ours) save production costs, support requirements, and aircraft weight while providing significant environmental advantages. The Lockheed Martin appliqués are described in greater detail in the article: "Paintless aircraft technology," Aero. Eng'g, November 1997, p. 17, which we incorporate by reference. Commerical airlines, like Western Pacific, use appliqués to convert their transports into flying billboards. We seek durable appliqués that can replace conventional military or commercial aviation paint systems to reduce lifecycle costs, improve performance, and protect the underlying surfaces from corrosion.

SUMMARY OF THE INVENTION

The present invention combines a surface coating via an array of appliqués with a vapor barrier to provide corrosion protection. The appliqués may provide adequate corrosion protection to eliminate altogether conventional surface corrosion protection treatments, thereby, saving weight and reducing environmental concerns. Alternatively, the combination of appliqué corrosion protection with environmentally friendly but relatively inferior, chromate-free conversion coatings may replace the environmentally sensitive, traditional corrosion protection techniques (i.e., chromated conversion coatings and primers).

Corrosion on metal surfaces or around metal fasteners in resin composite structures produces oxidation that reduces the surface quality and that frequently can make the structural integrity suspect. Maintenance to correct corrosion or to ensure that it does not occur is costly because it is labor-intensive. A more reliable corrosion protection system would find widespread acceptance in commercial and military aerospace.

In addition to the corrosion protection, the vapor barrier can be beneficial on aerospace structure to limit the migration of water through a structure. For example, with composite honeycomb sandwich structure, a vapor barrier appliqué coating can slow or eliminate the migration of water through the laminated face sheets into the honeycomb core.

Preferred appliqués provide corrosion resistance to the underlying surface because they incorporate an intermediate vapor barrier. Preferred appliqués have a 1–8 mil fluoroelastomer or other polymeric film as a topcoat (generally 2–6 mil), a vapor barrier typically about 1–4 mil thick (generally, 3 mil), and a 2 mil adhesive, typically pressure sensitive or thermally activated.

When making precision coatings that are important for aerodynamic drag and other considerations on modern commercial and military aircraft, spray painting is a relatively unreliable process because it is difficult to control the spray head and spraying conditions to obtain precisely the same coating from article to article. One variable in this spray process that often is overlooked is the natural variation from article to article in the vehicle to which the paint is applied. Such variation results from the accumulation of tolerances (i.e., the accumulated variation that results from variations within allowable control limits for each part in the assembly). The appliqué method allows better control of the manufacture of the coating so that it will have the correct spectral properties by distributing pigments, additives, and thin films properly throughout the appliqué and, thereby, over the surface. The benefits of appliqués are further enhanced if the appliqués simultaneously provide corrosion protection. Difficulties in precisely manufacturing painted coatings to obtain the desired properties can be overcome without the cost of either scrapping an entire article because the coating is imperfect and inadequate or forcing costly stripping and reapplication of the coating.

Using appliqués allows small area repair of the precision coatings on aerospace surfaces by simply cutting away the damaged area and reinserting a suitable, fresh appliqué patch. With paint, the spray transition between the stripped area and the original coating in such a repair is troublesome. For example, an entire panel usually needs to be re-coated with paint to fix a small area defect. Operations like paint spraying, surface preparation, masking or otherwise isolating the repair area, and the like slow the repainting process.

For thin appliqués, we recommend use of single or double transfer protective paper to facilitate their application. One sheet of protective paper overlies the surface of the appliqué that will interface and bond with the article. This surface has an adhesive or may have inherent tackiness to allow it to stick to the metal or composite aircraft surface. The exposed surface may have similar protective paper to reinforce it and to protect it during the positioning and transfer with peeloff following proper positioning. Identifying information and instructions can be painted on the transfer papers to simplify application of the appliqués.

Accordingly, the present invention relates to a corrosion protection appliqué for applying a substantially complete, bubble-free, wrinkleless coating to a surface. The appliqué has a vapor barrier to reduce substantially or to eliminate transport of water to the surface and an adhesive on at least one face of the vapor barrier for adhering the vapor barrier to a surface.

The present invention also pertains to a paintless coating system for replacing conventional paints on metal or composite aerospace parts and assemblies, comprising a topcoat, a vapor barrier interfacing with and completely underlying the topcoat, and an adhesive for adhering the vapor barrier to the parts.

A method of the present invention replaces conventional painted coatings on metal or composite aerospace parts or assemblies with a replaceable, resealable protective covering that, preferably, provides significant corrosion protection by stopping the migration of moisture. The method involves:

(a) cutting gores of a vapor barrier into a plurality of appliqués suitable for covering a predetermined surface of the part;

(b) adhering the gores to the part; and (c) optionally, sealing between gores at edge seams to provide a continuous vapor barrier between the part and its environment.

On bare clad A1 2024, the vapor barrier provides equivalent corrosion protection to a part having a conventional paint, a chromated conversion coating, and a chromated primer meeting military specifications.

The present invention also relates a method for sealing adjacent appliqués on a substrate to achieve an essentially continuous vapor barrier. First, we define a seam by positioning two appliqués on a substrate adjacent one another, each appliqué including a vapor barrier made from a polymer. Then, we apply a sealing appliqué having a vapor barrier over the seam to form a lap joint between the sealing appliqué and the positioned appliqués. Optionally, we seal edges of the sealing appliqué with polymer to bind the sealing appliqué to the positioned appliqués.

In one other aspect, the present invention relates to a method for essentially stopping the progress of corrosion at a site on an aircraft, comprising the step of applying a vapor barrier in the form of an appliqué over the site to eliminate transport of water to the site.

BRIEF DESCRIPTION OF THE DRAWINGS

FIG. 5 is a graph showing break frequency as a function of time for the appliqués of FIGS. 3 and 4.

FIG. 6 is another graph showing resistance-area as a function of time for the appliqués of FIGS. 3 and 4.

FIGS. 9 and 10 are graphs showing dielectric constant as a finction of time for the appliqués of FIGS. 3 and 4.

FIGS. 18 and 19 are Bode plots corresponding to Case 2 in Table 1.

FIGS. 24 and 25 are Bode plots of another preferred appliqué similar to FIGS. 22 and 23 but applied wet as discussed in Example 1.

FIG. 38 is another magnified plan view of scribe lines on a test specimen like that of FIG. 33 after exposure to 5% NaCl fog at 95° F. and pH 6.5–7.2 for 2000 hours.

FIG. 39 is another magnified plan view of the scribe lines on a test specimen having a gray appliqué of the present invention covering bare clad 2024 T3 aluminum after 2000 hours of salt spray conditions like those for the specimen shown in FIG. 38.

FIG. 42 is another elevation showing edge seal applied to a butt joint between appliqués on a substrate.

FIG. 43 is another elevation showing edge seal on a tapered butt joint between appliqués.

FIG. 44 is another elevation showing sealing of a butt joint between appliqués using a tape and edge seals.

FIG. 45 is another elevation showing sealing of the vapor barrier by applying an appliqué tape over the vapor barrier with the topcoat removed and edge seals for the tape.

DETAILED DESCRIPTION OF A PREFERRED EMBODIMENT

U.S. Pat. No. 4,986,496 teaches the making of flat appliqués for covering flow control surfaces, and the appliqué manufacturing techniques are applicable to the present invention. U.S. Pat. No. 5,660,667 (Davis) describes the manufacture of curved appliqués especially suited for use on complex (i.e. compound) curved surfaces common in aerospace. We typically form a vapor barrier into sheetstock and, then, roll coat the topcoat and adhesive onto this film.

Figure 1:
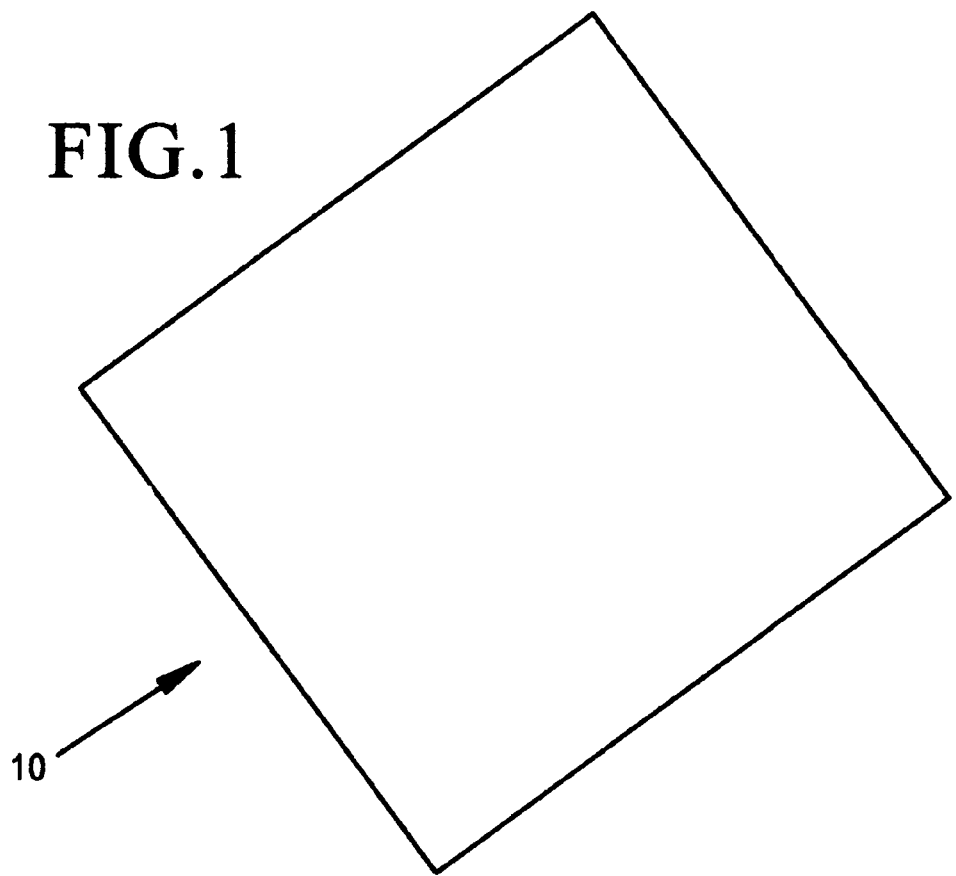
FIG. 1 is a schematic plan view of a typical appliqué.
Figure 2:
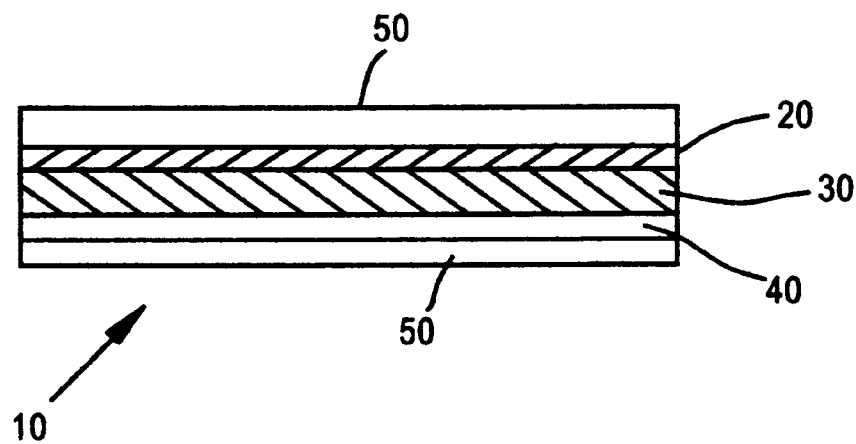
FIG. 2 is a schematic cross-section of the appliqué of FIG. 1 including protective paper on the contact surface and the exposed surface.
Figure 3:
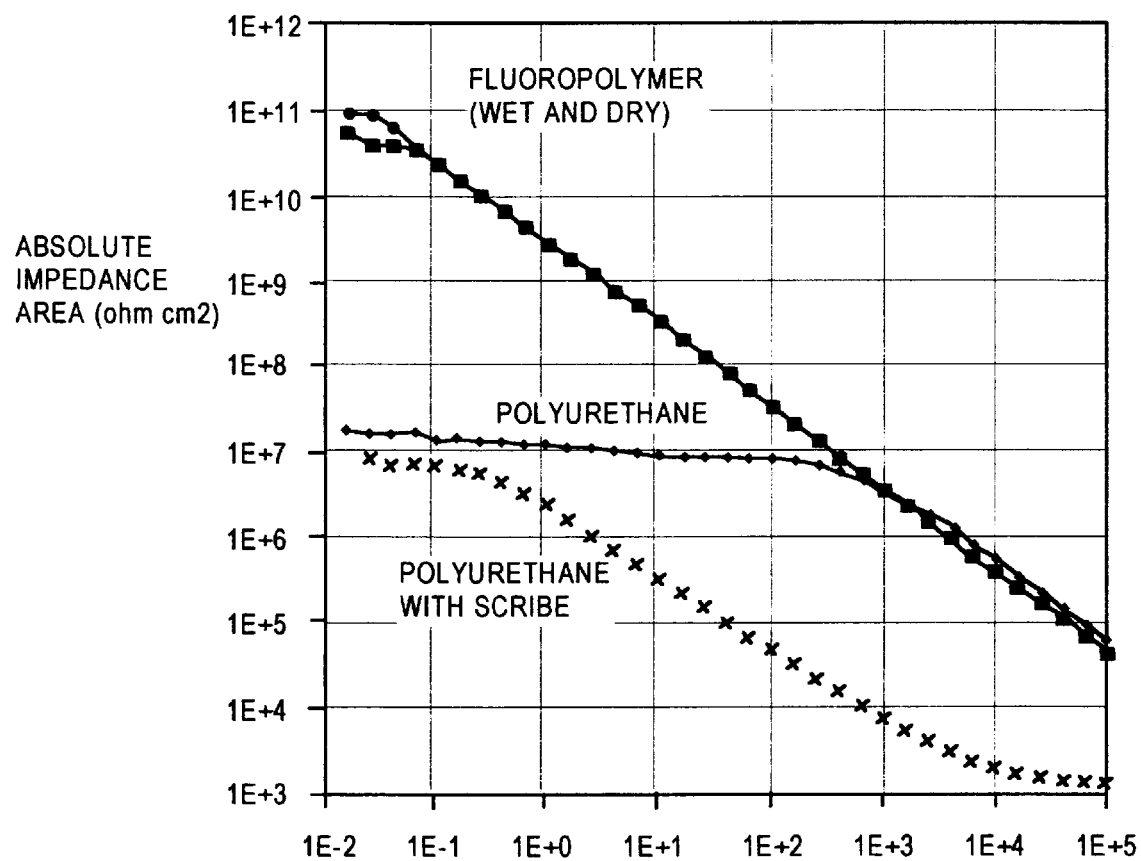
FIGS. 3 and 4 are Bode plots of a vapor barrier appliqué of the present invention showing corrosion protection.
Figure 4:
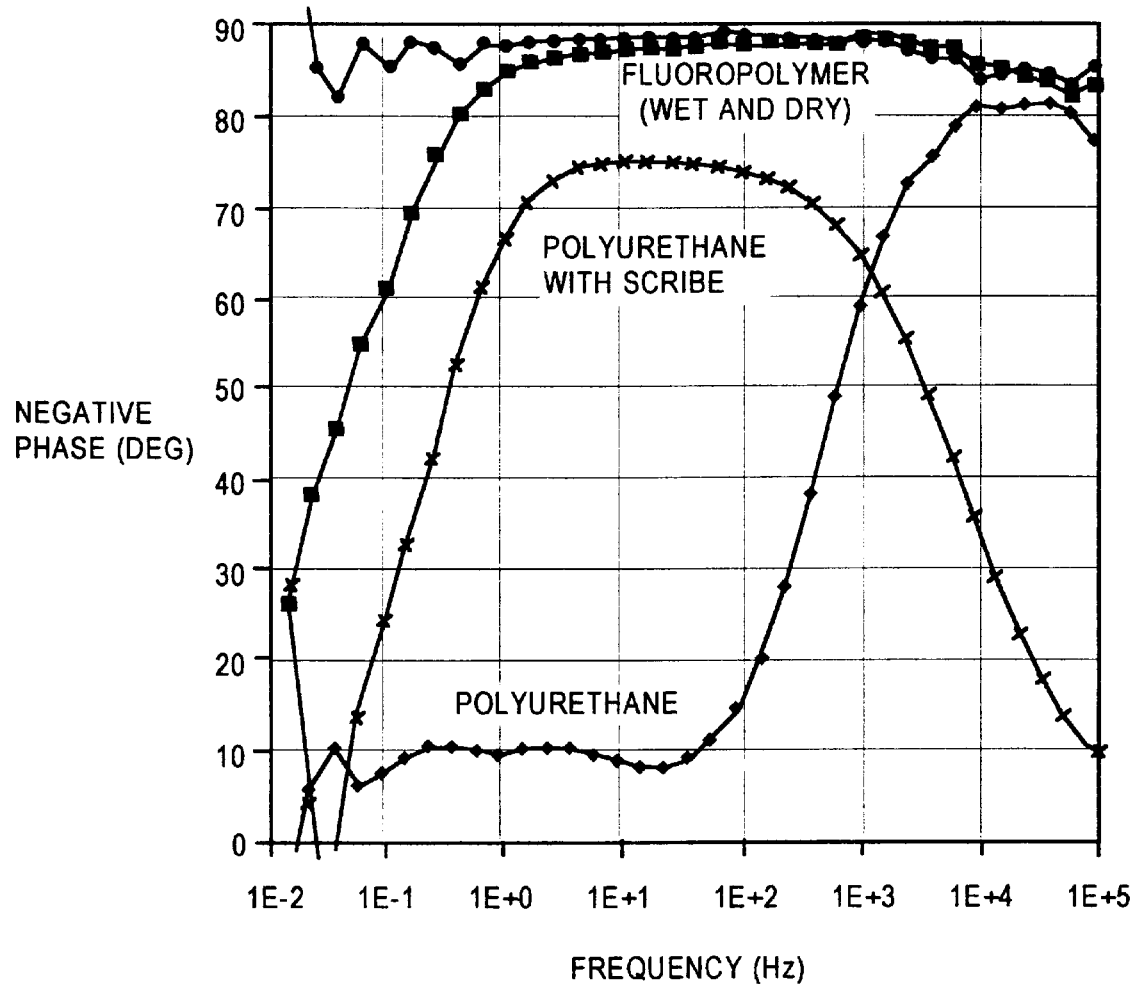
Figure 7:
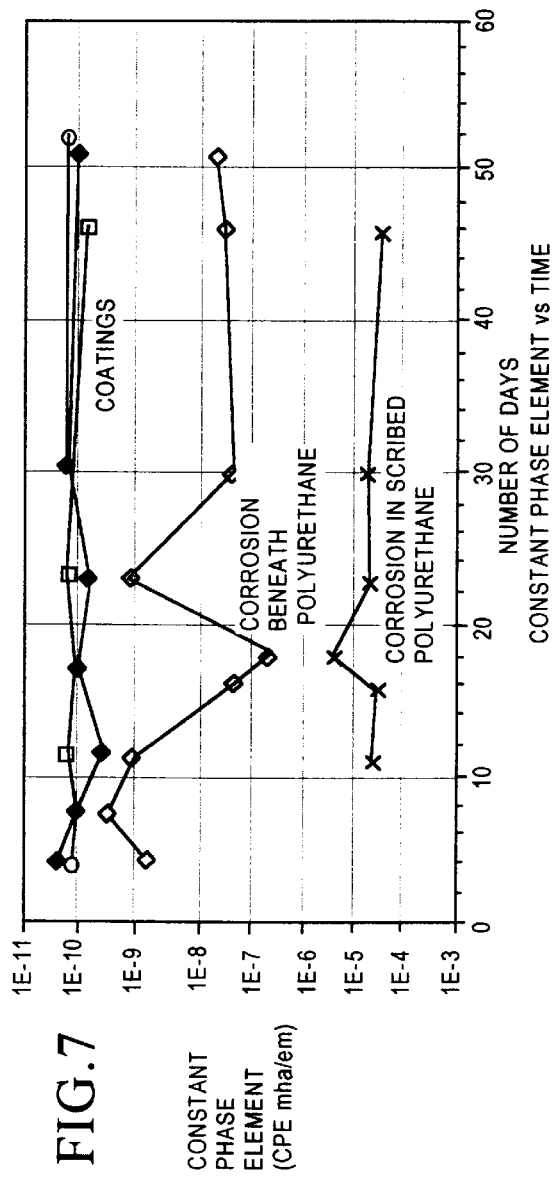
FIG. 7 is another graph showing constant phase element as a function of time for the appliqués of FIGS. 3 and 4.
Figure 8:
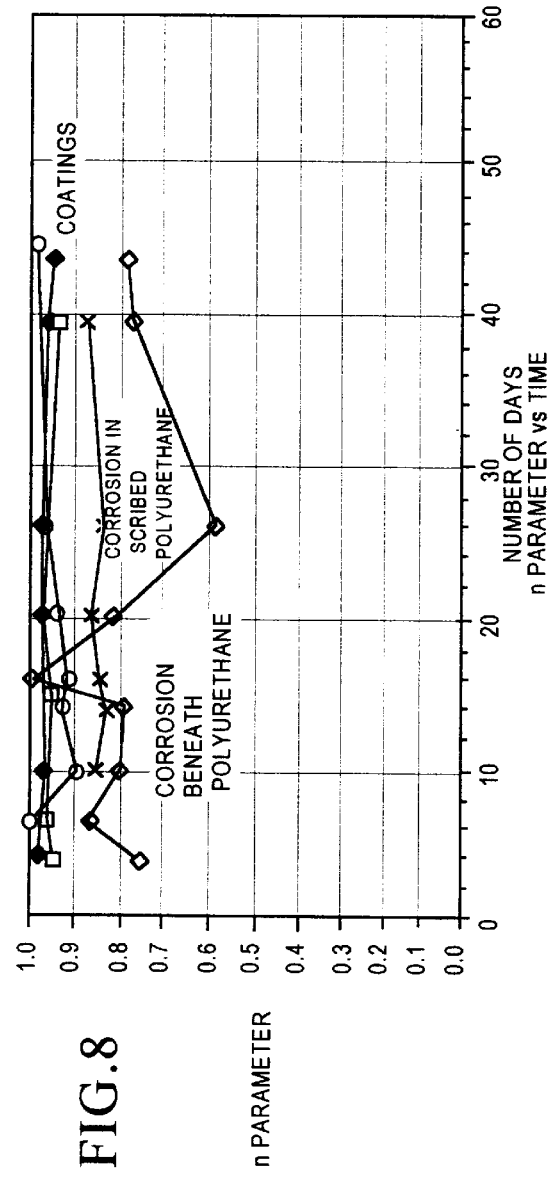
FIG. 8 is another graph showing "n" parameter as a function of time for the appliqués of FIGS. 3 and 4.

The external film or topcoat 20 (FIG. 2) for the appliqué 10 is typically an organic resin matrix elastomeric composite, particularly a fluoroelastomer about 0.001–0.004 inch (1–4 mils) thick. A vapor barrier 30 (particularly a fluorinated terpolymer, a metallized polymer, especially one having an aluminum thin film, or another fluoropolymer), and an appropriate adhesive 40, especially a pressure-sensitive or thermally activated adhesive (particularly 3M's 966 adhesive) applied as a separate layer complete the three layer structure of our preferred appliqués. The adhesives are commonly acrylic-based materials or rubbery polymers or copolymers. The fluoroelastomer should be tough, durable, and resistant to weather.

The adhesive should provide complete adhesion between the vapor barrier and the underlying substrate. In addition, it should be slow to absorb water.

The vapor barrier is the key to our corrosion protection enhancement by eliminating the transport of water to the metal surface. The vapor barrier should be durable to provide long life in the field. It should be stable in hot-wet conditions up to at least about 250° F. It should be tatterable so that it will shred to limit the progress of rips and peels that occur during use. It should be peelable by stretching for removal, when desired, for inspection or replacement, but it should remain adhered during flight.

The topcoat should provide increased durability and hardening to the vapor barrier. It can provide anti-static properties to the appliqué paintless coating by including dispersed carbon or graphite fibers. The topcoat provides color and gloss through appropriate pigments. It should be markable so that removable indicia can be imprinted on the topcoat. It should be UV-resistant. Our fluoroelastomer satisfies these criteria as well as any materials we have found.

The topcoat and vapor barrier combination should be durable but also should tear and tatter in the event that a peel initiates during flight.

The appliqués can be protected with single or double transfer protective paper (50, FIG. 2) to facilitate their application. One sheet of protective paper overlies the surface of the appliqué that will interface and bond with the article. This surface has an adhesive or inherent tackiness to allow it to stick to the metal or composite aircraft surface. For very thin appliqués, the exposed surface of the topcoat may also have similar protective paper to reinforce it and to protect it during the positioning and transfer. We peel off this protective paper following proper positioning. Identifying information and instructions about how, where, and in what order to apply the appliqués can be printed on the transfer papers (or directly on the topcoat of the appliqué) to simplify their placement and positioning.

Figure 11:
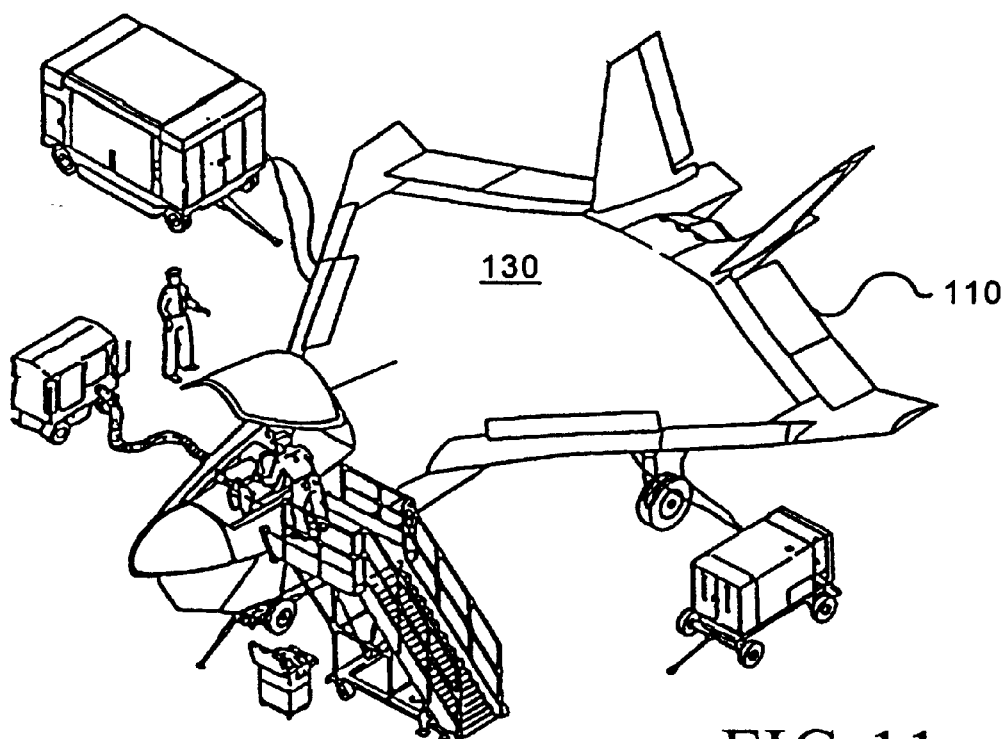
FIG. 11. is an isometric of an aircraft covered with appliqués to provide a paintless coating.
Figure 12:
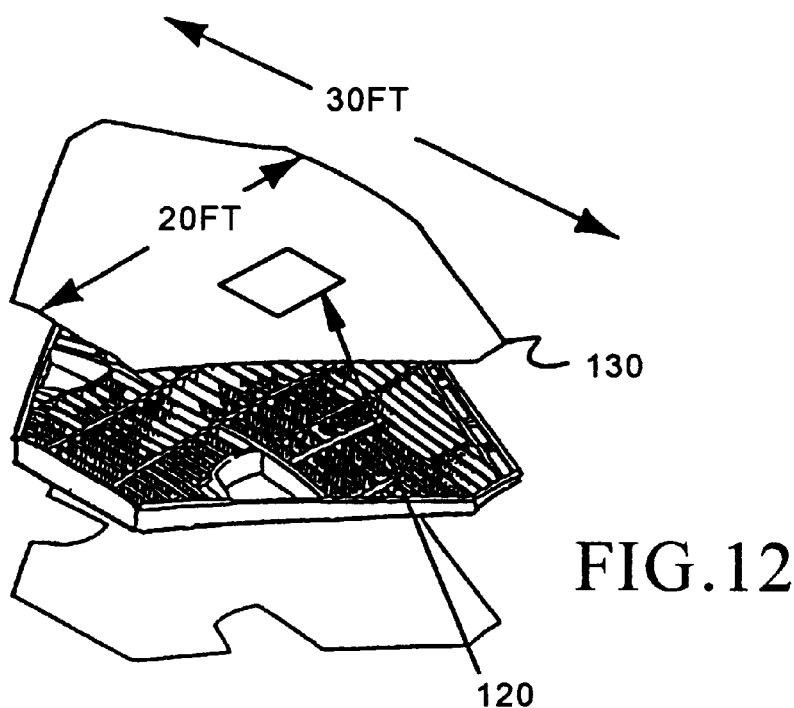
FIG. 12 is an exploded view of the wingbox of the aircraft of FIG. 11 showing the location and orientation of a typical appliqué.

The benefits of paintless coatings for aerospace include: (1) reduction of hazardous materials and waste both during initial application and during stripping and replacement, (2) mitigation of corrosion which would in turn reduce requirements for corrosion inspection, repair, and replacement, (3) potentially increased aircraft life, and (4) significant life-cycle cost savings for application and maintenance. As shown in FIG. 11, concurrent maintenance can occur on the aircraft 110, in the cockpit, for example, while the appliqués are inspected, repaired, or replaced. While the curvature dictates the size and shape of an appliqué, a typical appliqué 120 applied to the upper wing skin 130 might be rectangular as shown in FIG. 12. To replace paint, the appliqués cover all, substantially all, or merely a part of the aircraft surface where paint would be used. Hot areas or areas particularly prone to erosion might require traditional treatments or coatings in addition to the common appliqués.

The gores are generally 2-dimensional, flat panels that are sized to conform to a 3-dimensional surface, similar to the sections of a baseball. During installation, trimming often is required for achieving the final fit. The gores may have different thicknesses depending upon their intended location on the object. We use thicker gores in areas exposed to high wear or in impact zones.

Decals and appliqués normally are manufactured as flat material that is flexible and readily bent. Material of this form can easily be applied to both flat surfaces and simple curved surfaces such as cylinders, cones, and rolling bends. More complicated surfaces involving compound curvature can only be covered if the material can be stretched or compressed to avoid wrinkling and tearing. If the material is not sufficiently elastic, cutting to permit overlapping, or wedge removal, as well as addition of darts, can be useful to extend coverage with a nominally flat appliqué or decal material. Such approaches can be time consuming, damaging to the applied material, and of questionable use if the material has any preferred orientation (as, for example, with riblets.)

Presuming that a material is somewhat elastic, Davis describes that a decal graded according to Gaussian curvature (GC) would be suitable for surfaces within a certain range of Gaussian curvature. A given complex curved surface can be divided up into zones with corresponding Gaussian curvature ranges. Within each zone a single premolded decal can be used. As with surfaces suitable for covering with flat materials, each zone could involve a great variety of surface shapes subject only to the specified range of Gaussian curvature.

We generally make the appliqués entirely from flat (GC=0) material and accommodate curvature by the inherent stretchiness and resilience of the appliqués. Our appliqués are primarily made from fluoroelastomers that are relatively forgiving and easy to work with. Molded appliqués like Davis suggests may be desirable for surfaces where the curvature is changing rapidly, but they generally are not required.

Figure 52:
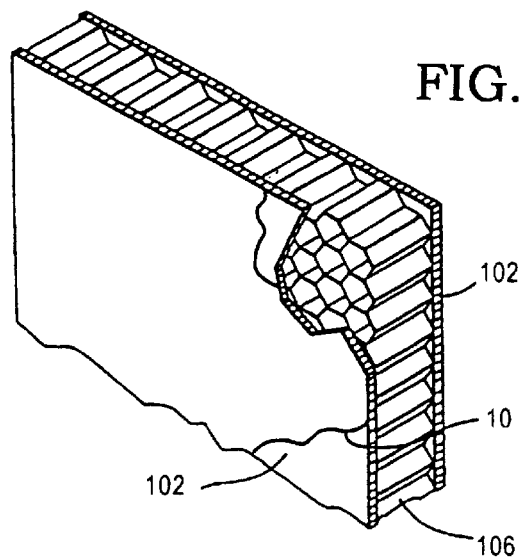
FIG. 52 is an isometric of an appliqué having a vapor barrier adhered to a composite honeycomb sandwich panel to reduce migration of water through the face sheet to the honeycomb core.
Figure 33:
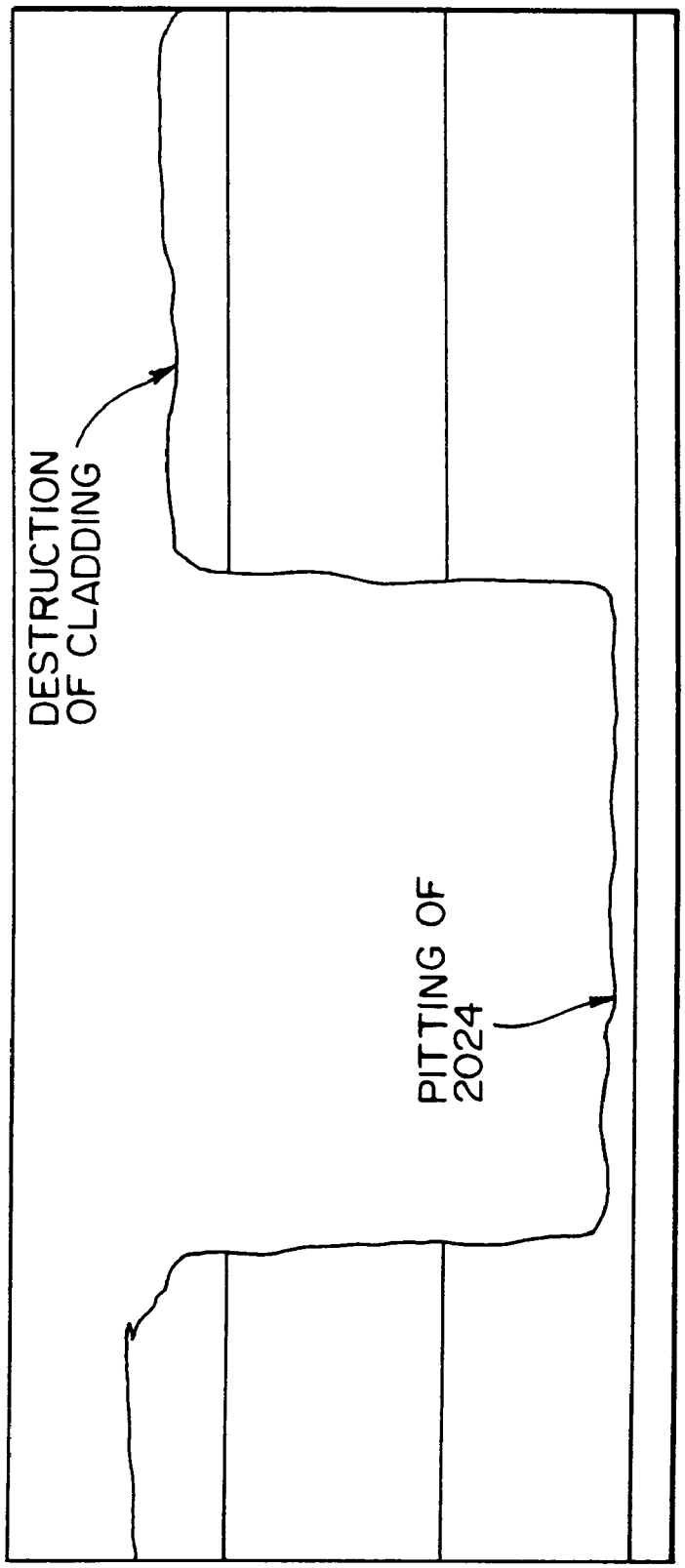
FIG. 33 is an enlarged elevation of a scribe line through the conventional military specification polyurethane paint—epoxy primer coating system on an Alodine 600 treated clad 2024 T3 aluminum test specimen showing the progress of filiform corrosion.
Figure 34:
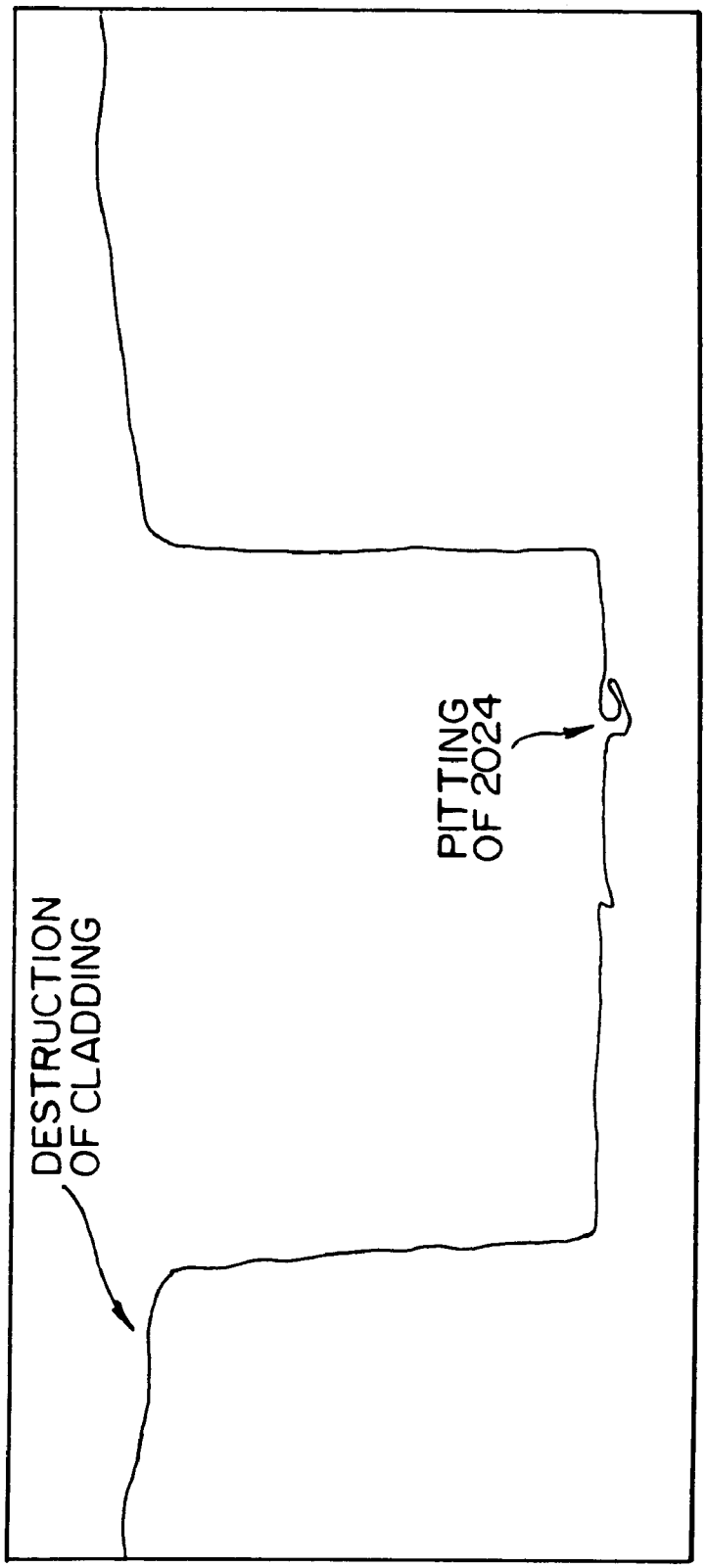
FIG. 34 is an enlarged elevation, similar to FIG. 33, of a scribe line through a clear fluoropolymer appliqué of the present invention on clad 2024 T3 aluminum without an Alodine 600 conversion coating or military specification primer showing the progress of filiform corrosion.
Figure 35:
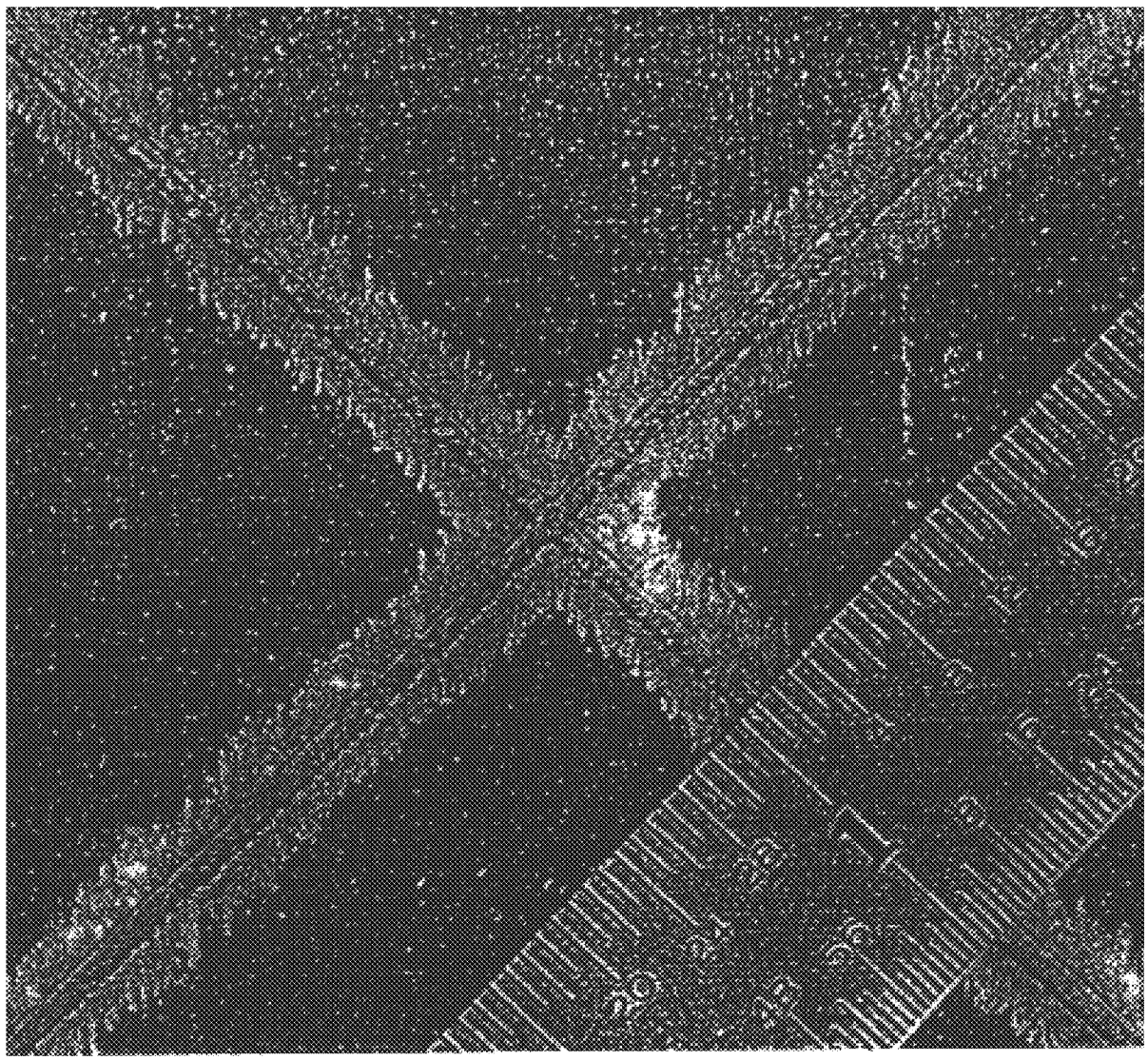
FIG. 35 is a magnified plan view of the scribe lines in a test specimen like that of FIG. 34 showing the progress of filiform corrosion under the appliqué on clad 2024 T3 aluminum without a conversion coating or primer.
Figure 36:
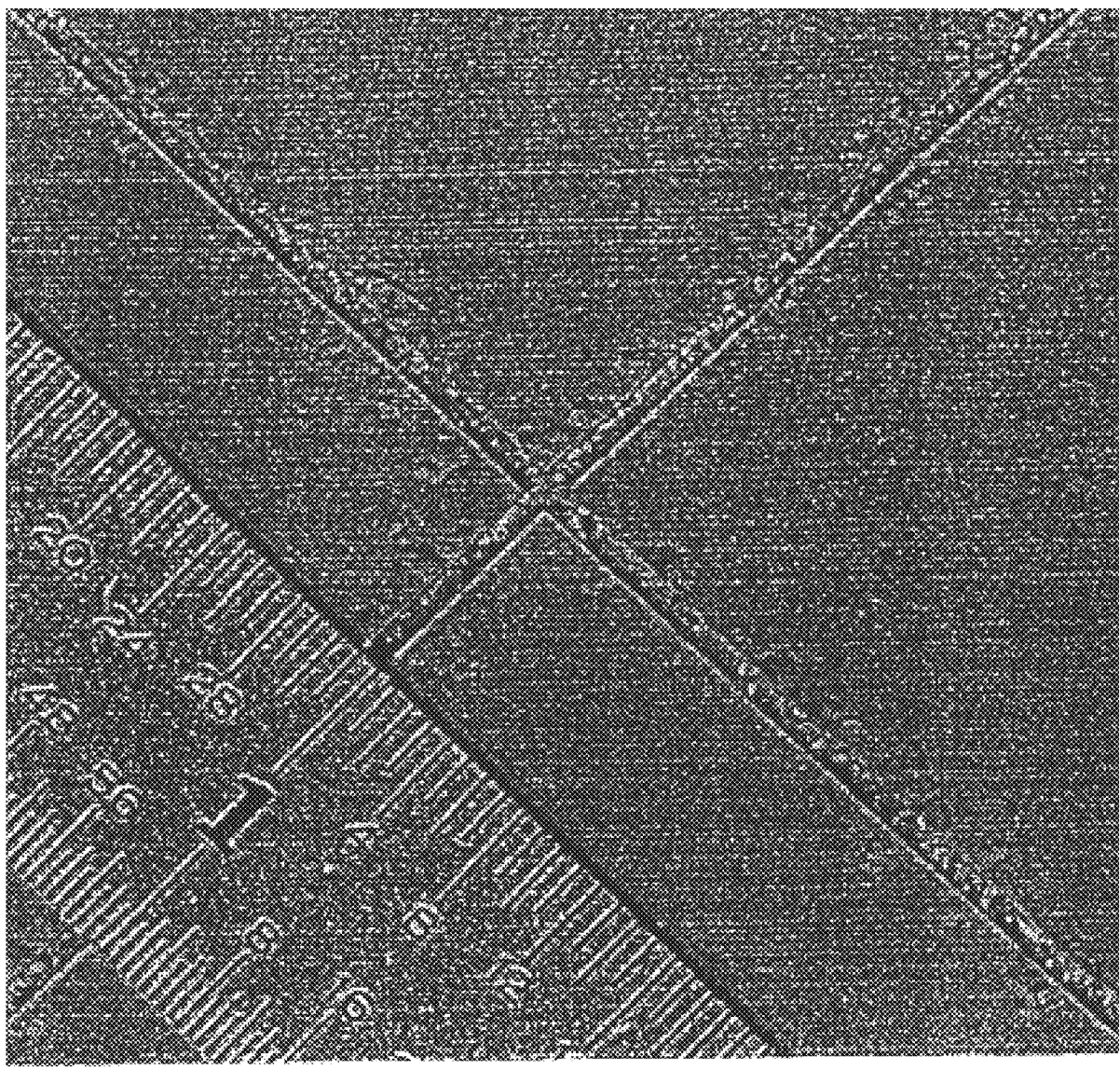
FIG. 36 is another magnified plan view of the scribe lines of a test specimen corresponding to the specimen of FIG. 33 showing the typical progress of filiform corrosion under a conventional military specification coating—primer—conversion coating system.
Figure 37:
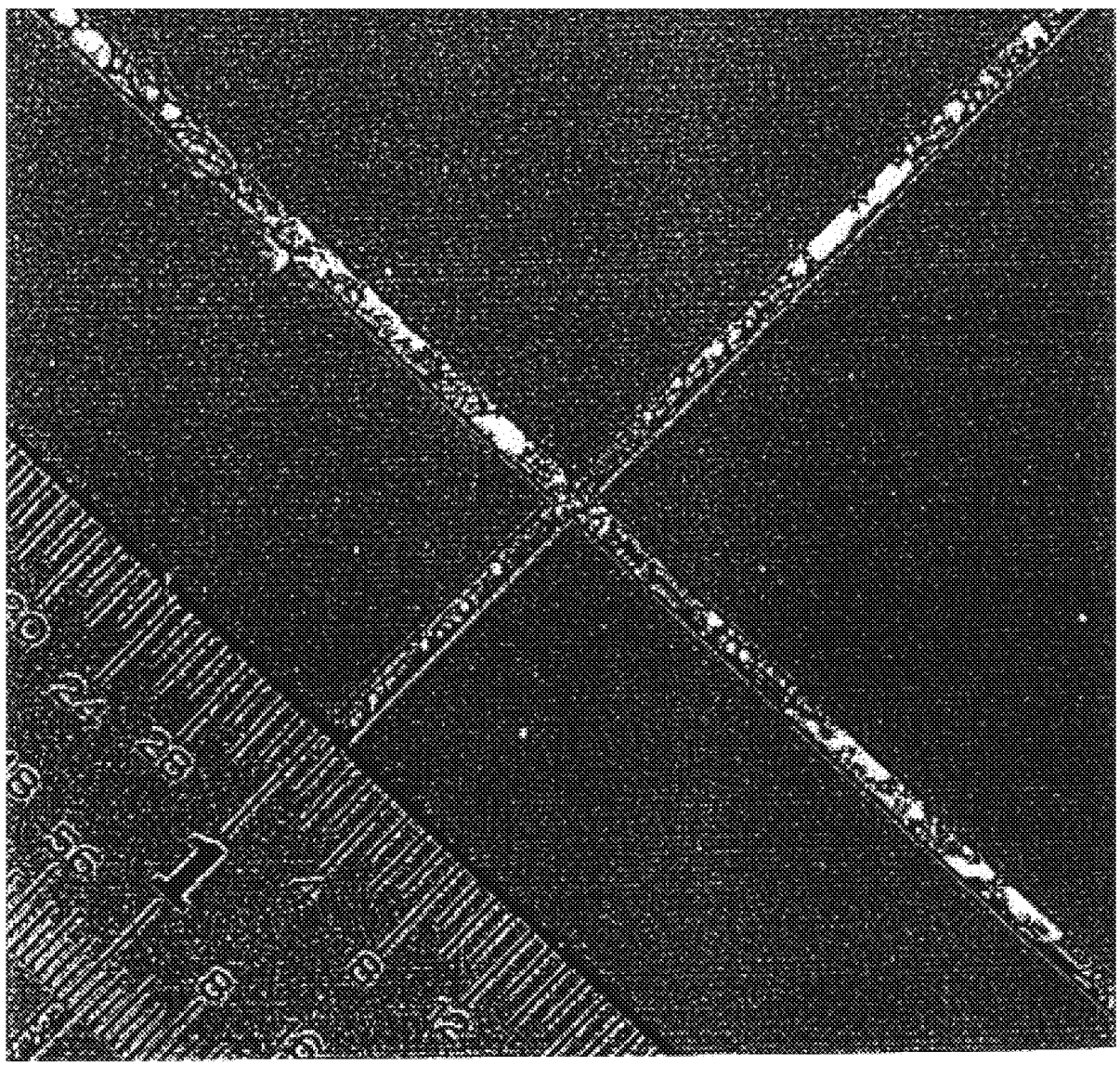
FIG. 37 is another magnified plan view of the corrosion protection afforded b the appliqués of the present invention on clad 2024 T3 aluminum protected with an Alodine 600 conversion coating and MIL-P-85582 primer under salt spray conditions.
Figure 40:
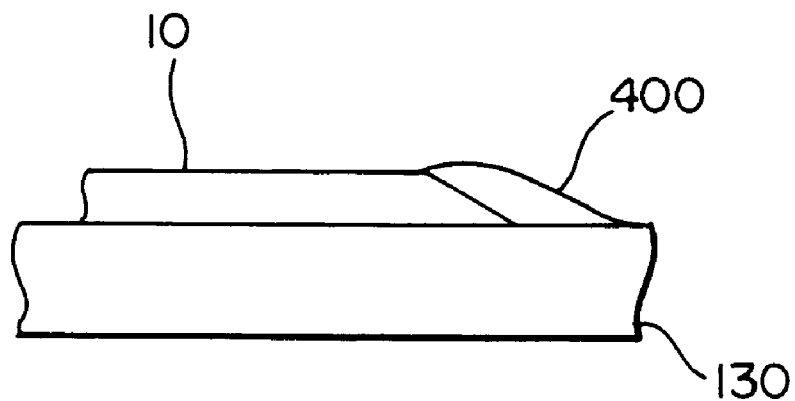
FIG. 40 is an elevation showing edge seal on an appliqué adhered to a substrate.
Figure 41:
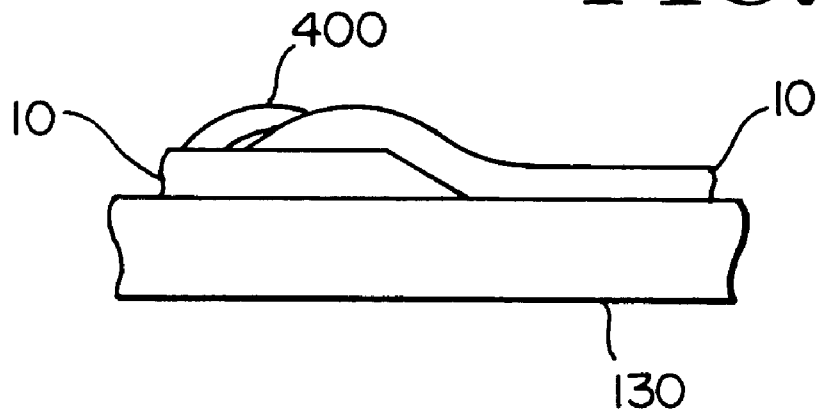
FIG. 41 is another elevation showing a typical lap joint with edge seal for appliqués of the present invention.

Our studies of paintless coatings achievable with appliqués included evaluation of many different films, coatings, and adhesives. We selected vapor barrier films and humidity resistant adhesives for use in our paintless coatings. We evaluated the ability of vapor barrier films to improve corrosion protection significantly compared with paint. Our hypothesis was that corrosion of metal and other surfaces is inhibited by preventing the dynamic transport of water to and from the surface. Potentially, selective use of our vapor barrier films could prevent or mitigate internal aircraft corrosion. They could also slow or prevent the migration of water through resin composite laminated face sheets 102 into underlying honeycomb core 106, a problem that leads to excessive weight. (FIG. 52).

Our evaluation tests included standard salt immersion and salt spray with scribed and unscribed panels. We followed changes in the surfaces as a finction of salt exposure using microscopy and electrochemical impedance spectroscopy (EIS). These tests indicated outstanding corrosion protection (negligible change in the surfaces) of panels coated with a vapor barrier adhered to the surface during and following completion of 2,000 hours of salt spray exposure, while significant corrosion damage occurred to the painted surfaces that we used as a control for comparison. Many of the scribed test panels with these appliqués over MIL-P-85582 (a chromated epoxy) primer showed little or no observable degradation of the surface or the scribe line. We also have demonstrated benefits of a paintless coating on untreated aluminum of various types to panels which were chemically or electrochemically treated, and plan to test performance of the appliqués when the surface are treated with various non-chromated primers. These tests indicate that vapor barriers provide surface corrosion benefits. It may be possible to forego primers altogether while maintaining improved corrosion protection.

Davis suggests that flat material can wrinkle or tear when applied to surfaces of complex curvature because the material is insufficiently compressible or stretchable. While darts or wedge removal, like the techniques used in tailoring clothes, does permit some contouring to complex curvatures, these tailoring techniques require complicated planning and skilled labor to produce a seamless, complete, bubble-free, and wrinkleless coating. It, too, wastes material and does not deal with the unique irregularities of an actual article. That is, tailoring presumes that each article of the same nominal type will have identical surface contours. In reality, with hardware as complex as aircraft, each aircraft has subtle but significant differences in their surface curvature and characteristics. These subtle changes dictate individual tailoring rather than mass production.

Figure 51:
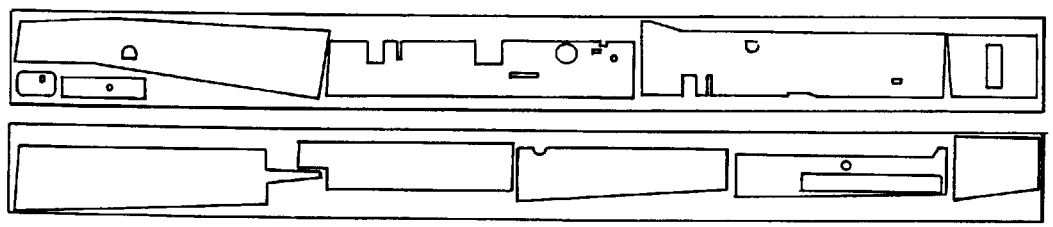
FIG. 51 is a plan view of the pattern of gores to be cut from appliqué sheetstock using computerized cutting equipment.

If we elect to make curved appliqués like Davis recommends, we make an article-by-article evaluation of the surface curvature to identify lines of constant Gaussian curvature. Otherwise, we analyze the surface curvature to design flat gores of appropriate size and shape to cover the surface (FIG. 51). This analysis is simplified to some degree if the article is designed to permit digital preassembly of solid models of the respective parts (as available for Boeing's 777 aircraft), but the curvatures can be identified as well using profilometry with conventional laser coordinate measuring apparatus, photogrammetry, or the like. Surface profiles permit identification of the actual curvature of the surface of interest rather than the theoretical curvature that the design data suggests. Profilometry likely is necessary for precise coatings. The equipment to plot the profile also is useful for the marking of lines of constant Gaussian curvature and geodesics on the surface of interest so that the respective appliqués can be laid down in a "color-by-number" process. By "marking," we mean that the locale for each appliqué is identified. Such marking can be done with projection lights or with more traditional marking methods (chalklines, pencil, etc.).

Figure 50:
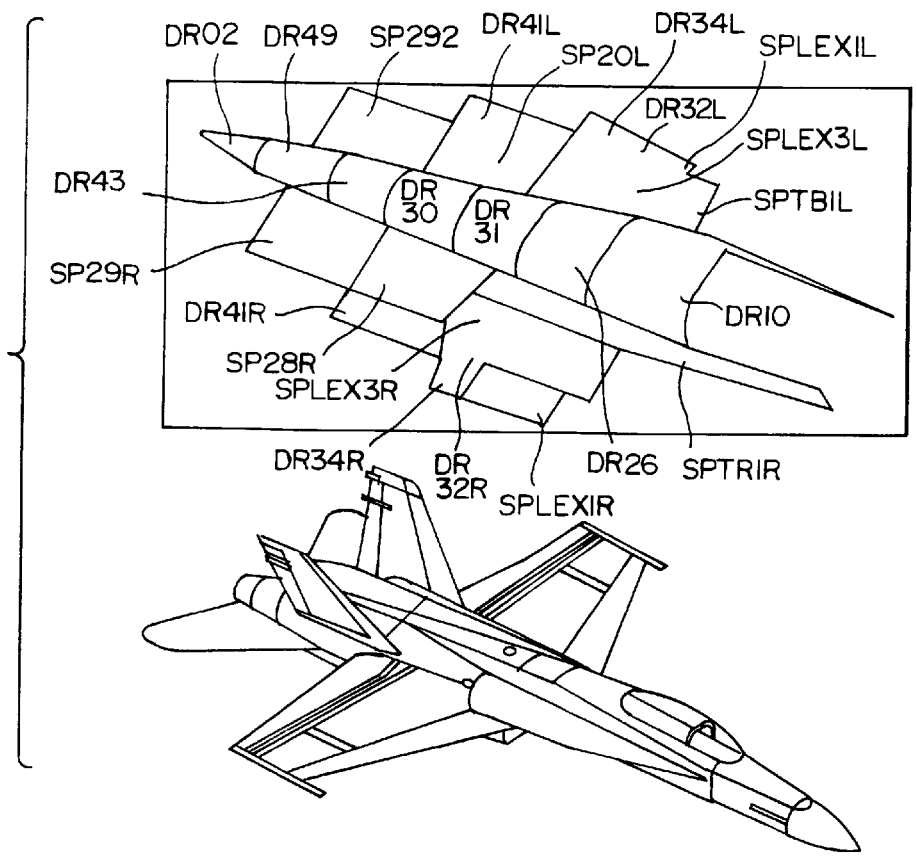
FIG. 50 is an isometric view showing the pattern of appliqués used on the turtleback section of an F-18.

The surface analysis allows us to decide the size and shape of appliqué gores needed to cover the surface of interest. It also allows us to decide which appliqués will be made from flat sheetstock and which will be molded to a complex curvature. We determine the order in which we will apply the gores and can apply numbers or other instructions to the appliqué itself or to the transfer paper to order gores in the coating kit. Curved surfaces may dictate curved appliqués or smaller, flat appliqués that can accommodate the curvature. We prefer to make each appliqué as large in area as possible while still having the appliqués be easily handled by a single worker. Large area appliqués reduce part count in the kit. Our appliqués are generally two–four feet wide and five to eight feet long, although the size and shape can vary depending on the shape and curvature of the surface to which the appliqués are applied. One pattern of appliqués is shown in FIG. 50 wherein the alphanumeric designations identify separate gores. Our appliqués typically have considerable stretchiness, especially if they are thin, so they can conform to curved surfaces.

Gaussian curvature is a surface property for measuring of compound curvature. This topic is normally discussed in texts on differential geometry and is not widely known in the engineering community. The concept is best understood by considering a mathematical plane that includes the surface normal vector at a particular point on a curved surface. The curve formed by the intersection of the plane with the curved surface is known as a normal curve. If the plane is spun around the axis defined by the surface normal, an infinite family of normal curves is generated. In some particular orientation, a maximum curvature will be obtained. A surprising result from differential geometry is that a normal curve with minimum curvature occurs when the plane is turned by 90°. These two curvatures are known as principal curvatures, and can be used to describe the curvatures for other normal plane orientations via a simple formula. Each principal curvature can be expressed as the reciprocal of the local radius of curvature. The Gaussian curvature is simply the product of the two principal curvatures. Two elementary examples help to illustrate the concept. For a point on a cylindrical surface, one principal curvature is zero (that is, travel along the surface in the direction of the longitudinal axis is travel on a straight line). The Gaussian curvature is also, zero, since it is the product of the principle curvatures where one principle curvature is zero. The Gaussian curvature is also zero for all other surfaces that can be formed by bending a flat material, since these shapes can be transformed into one another.

Another simple example is a sphere. The entire surface has a Gaussian curvature equal to the inverse square of the radius. Saddle-shaped surfaces will have a negative Gaussian curvature since the centers of curvature occur on different sides of the surface. In the most general case, the Gaussian curvature will vary across a surface. A good example of the more general case is a (football-like) prolate ellipsoid, which has its highest Gaussian curvature at its ends.

A decal or appliqué with a particular Gaussian curvature (GC) can be formed on a symmetrical mold such as a sphere (or symmetric saddle). Provided that it is flexible, the appliqué or decal will fit without wrinkling onto any other surface with the same GC, even if it is bent and asymmetric. The molded material in this case also can be applied on the actual surface in any desired orientation rather than in a particular orientation (like a jigsaw puzzle piece would require). If the material is able to stretch (or to compress), it should be suitable for covering some range of GC values. An ellipsoidal mold can be used to create transitional decals which have a gradient (i.e., a known variation in GC).

Premolded appliqués can be applied to aircraft markings on complex curved surfaces and offer an alternative to painting. While valuable on commercial aircraft, appliqués are especially well suited to military aircraft where there is a need to change camouflage and other low signature coverings to suit the theater of engagement. Appliqués could be commercially valuable in many other areas, such as automobiles, boats, and other commercial products.

Davis describes ellipsoidal mold that has lines of constant Gaussian curvature in a symmetrical pattern running from the center to the ends. The lines are "straight" lines on the surface that extend parallel to one another in a transverse direction on the ellipsoidal mold. The lines correspond with global lines of latitude on common maps. Geodesics marked on the surface extend longitudinally in graceful curves from pole to pole analogous to lines of longitude on global maps. Davis's appliqués are centered on each constant GC line, and usually are diamond-shaped. We can use a similar plotting protocol to position our flat gores in the appropriate location and orientation.

For purposes of this discussion, a geodesic is the shortest line extending on the surface between two points. On a sphere, a geodesic would be the "great circle" connecting the two points. A geodesic has a curvature vector equal to zero and has the principal normal coincide with the surface normal.

Davis's appliqués having one nominal GC are placed along the corresponding line of constant GC while appliqués having a different nominal GC are placed along their corresponding lines of constant GC. The bodies of the appliqués stretch to make the transition between curvatures. The ends of an object often are covered with relatively large cup or tulip shapes. The various appliqués fit together to cover the entire surface without wrinkles, gaps, or bubbles.

Appliqués of constant Gaussian curvature can be made on a mold and transferred to aircraft, boats, trucks, or the like by placing appliqué on lines of corresponding GC on the surface of interest. Other appliqués are selected and placed in similar fashion to cover the entire surface. Each appliqué has substantially one Gaussian curvature along one characteristic, primary axis and transitional fingers or extensions of the appliqué extending outwardly from the primary axis. The fingers have varying Gaussian curvature because they stretch or because of their molding for placement along the geodesics.

The primary size of the appliqués depends on the severity of the curvature of the surface they will cover. Smaller pieces are required if the gradient of the curvature is large, that is, where the GC changes over a short distance. Flat appliqués of GC 0, of course, can be used for cylindrical solids, flat surfaces, and any other large areas of GC 0. A family of molds of differing size would supply appliqués of positive GC. A similar saddle mold family provide corresponding appliqués having negative GC's.

The appliqués can be applied wet or dry using squeegees, mat knives, rubber rollers, wallpaper tools, and the like to place and smooth the films. Extracting the trapped air or water with a hypodermic syringe eliminates bubbles. Interfacing appliqués usually are overlapped ¼ to ½ inch or more, but butt joints are possible. The extent of overlap is limited because of weight and cost factors but also because the appliqués stick more securely to the substrate than to one another. Overlaps can be a source of peeling in flight, because of the poorer appliqué-to-appliqué adhesion.

As described in U.S. Pat. No. 4,986,496, the appliqués can include surface patterns, and might include plasticizers, extenders, antioxidants, ultraviolet light stabilizers, dyes, pigments, emissivity agents (like silicon carbide), chopped or continuous fiber reinforcement, or the like, to provide the desired color, gloss, reflectivity, or other surface characteristics. Chopped fibers can provide improved toughness and anti-static properties, for example.

Generally the pigments are metal flakes, metal oxide particles, or organometallic particles, and typically are mixtures of several types of material. Suitable aluminum flake pigments include the Aquasil BP series of pigments available form Siberline Manufacturing Co. The pigments might be glass, mica, metals (like nickel, cobalt, copper, bronze, and the like available from Novamet) or glass flake, silver coated glass flake, mica flake, or the like available form Potters Industries, Inc. These flakes typically are about 17–55 $\mu$m for their characteristic dimension. In some applications, ceramic pigments may be appropriate. Of course, the pigments can be mixed to provide the desired characteristics for the coating.

Titanox 2020 titanium oxide pigments are available from NL Industries. Copper oxide or iron oxide pigments are available from Fischer Scientific. NANOTEK titania, zinc oxide, or copper oxide pigments are available from Nanophase Technologies Corporation. These pigments are generally spherical with diameters in the range form about 30 nm (for the NANOTEK pigments) to micron sizes.

Preferred pigments are essentially pure metals (with suitable surface conversion coatings) having a thickness of about 1000 Å±5–10% (i.e., 900–1100 Å and, preferably, 950–1050 Å). These pigments otherwise should meet the conventional specifications for paint pigments. In that regard the pigments (also called particulates or flakes) must be thick enough to provide opacity while producing minimum edge effects (scattering). A characteristic dimension, then, for either the length or width would be 20–100 $\mu$m, and, preferably, 30–50 $\mu$m. We target particulates of characteristic nominal dimensions of 50 $\mu$m×50 $\mu$m×1000 Å (i.e. 0.1 $\mu$m).

Films of the pure metals of the desired thickness can be prepared by sputtering the metal onto two mil thick fluorinated ethylene propylene (FEP) sheetstock. Making this film product is done according to the conventional processing steps for making food or vacuum bagging materials. The method of the present invention removes the metal from the metallized film in two, simple and quick immersion steps. First, the metallized roll is immersed in a caustic (basic) bath for about 15 sec to loosen the metal. Then, we immerse the roll again for about 15 sec in a dilute acid solution to neutralize the base and to separate the metal. We brush the particulates from the FEP, and precipitate the particulates in the acid solution prior to filtering, rinsing, and drying.

To separate the metal from the FEP, we generally contact the metal with counter rotating cylindrical nylon bristle brushes. We sometimes use ultrasonic vibration alone or in combination with the brushing. For brushes, we prefer 3 inch nylon bristle (0.010) diameter) spiral wound brushes available from Richards Brush Company.

For aluminum thin films, we prefer to use 7 wt % $Na_2CO_3$ as the base, but can use $NaHCO_3$, $NaCO_3/NaHCO_3$ mixtures, or conventional alkaline or alkaline earth hydroxides diluted to about a pH of 9.0. The acid solution preferably is 0.01–0.1 N acetic acid at pH 3.4–3.6, but could be phosphoric acid or a dilute mineral acid.

For germanium thin films, we prefer to use 2.5 N NaOH as the base with acetic acid or with ultrasonic vibration replacing the acid solution.

The base immersion takes about 15 seconds. Prior to the acid immersion, we allow the base-treated metallized film to be exposed to air for about 25 seconds. The acid immersion lasts about 15 seconds before we brush the particulates from the FEP. We tow the metallized roll through the several operations in a continuous process, as will be understood by those of ordinary skill.

We monitor the pH of the acid tank with conventional pH or ORP meters and add acid as necessary to maintain the desired pH and redox potential.

We recover the particulates from the acid bath by filtering, rinsing, and drying. We size the particulates. Then, we conversion coat the particulates using convention aluminum treatments like chromic acid anodizing, phosphoric acid anodizing, Alodine treating (particularly using either alodine 600 or alodine 1200); cobalt-based conversion coating as described in Boeing's U.S. Pat. Nos. 5,298,092; 5,378,293; 5,411,606; 5,415,687; 5,468,307; 5,472,524; 5,487,949; and 5,551,994; or sol coating. The sol coating method creates a sol-gel film on the surface using a mixed organozirconium and organosilane sol as described in Boeing's U.S. Pat. No. 5,849,110, or U.S. Pat. No. 5,789,085. We incorporate by reference these Boeing patents.

The different treatments can impart different tint to the flakes. Alodine imparts a yellow or greenish-yellow tint. The cobalt treatments impart blue tints.

The sol coating is preferably a mixture of organometallics wherein the zirconium bonds to the aluminum flake covalently while the organic tail of the organosilane bonds with the paint binder. The anodizing treatments prepare the surface to achieve adhesion primarily by mechanical surface phenomena. The sol coating provides both mechanical adhesion (surface microroughening) and adhesion through chemical affinity, compatibility, and covalent chemical bonds.

The topcoat forms a protective film over the vapor barrier, and should be selected from suitable materials to retain the corrosion protection properties of the appliqué system. The corrosion protection performance is illustrated in FIGS. 3–10 and 22–32 for our preferred vapor barrier. Even if the appliqués are not optimized for eliminating corrosion, the appliqué coating should still improve lifecycle costs and maintenance by allowing simpler coating replacement and zonal overhaul (concurrent maintenance) of the aircraft in its regular depot maintenance. Engines can be overhauled, for example, on one side of the aircraft while inspection, patching, and repair of the paintless coating can proceed on the other side of the aircraft as shown in FIG. 11. Normal paint repair requires that the aircraft be isolated in a spray booth where other maintenance or inspection cannot be conducted simultaneously.

The preferred topcoat is a fluoroelastomer, especially a modified CAAPCOAT Type III or Type IV rain and thermal resistant fluoroelastomer available from the CAAP Company suitable for roll coating in the appropriate colors and with appropriate additives as previously described. The preferred vapor barrier is a fluoropolymer from 3M, especially a terpolymer derived from tetrafluoroethylene, hexafluoropropylene, and vinylidine fluoride (THV). Metallized thin-film vapor barriers have also shown promise in this application, especially aluminum vapor depositions. The vapor barrier's function is to eliminate active transport of water vapor or other corrosive agents to the surface. The preferred adhesive is a pressure-sensitive acrylic adhesive designated as product 966 or other experimental adhesives available from 3M. The adhesive should hold the appliqués on the surface during normal operation of the vehicle, but should be peelable without leaving a residue for replacement of the appliqué inspection of the underlying surface. It should have low eletrolytic (ion transporting) properties for the best corrosion performance. Additives common used in adhesives to improve tack might degrade the corrosion protection. The appliqué may be re-adhered to the surface is some cases, especially if the area uncovered is small.

Pigments and other additives can be incorporated into the topcoat, vapor barrier, or both. An anti-static layer generally is incorporated into the exposed surface.

Seams between appliqués in lap joints or butt joints are sealed with a seal bead 400 made from topcoat applied like caulk to adhere the adjacent appliqués together, as shown in FIGS. 40 to 45 for lap and butt joints with flat and tapered edge appliqués. FIGS. 44 and 45 show sealing arrangements using seam tapes. In FIG. 45, the topcoat 20 is removed so that the tape adheres to the vapor barrier 30.

A thicker vapor barrier or multiple vapor barrier layers might assist in its retaining its corrosion protection integrity. Typically the vapor barrier is about 1 to 4 mils thick, and generally 3 mils. Thicker films add weight, but the appliqués are still likely to be lighter than multiple paint coats that are commonly used today. The appliqués initially are about the same weight to slightly heavier than an ordinary, single coat, paint-primer coating system, like MIL-C-85285 polyurethane over MIL-P-25377 epoxy primer.

The vapor barrier might include a metallized film on one or both surfaces (generally, on the surface adjacent the adhesive, if metallization is used). Such barriers appear to provide significant corrosion protection, perhaps by providing a sacrificial film, but, more likely, by reducing the permeability of the organic resin film that otherwise constitutes the barrier.

The appliqués have the potential to eliminate the need for chromated primers on the substrates. For example, when tested on clad 2024 T3 aluminum alloy test plaques, the appliqués provided equivalent corrosion protection to using both a chromated primer and a chromated conversion coating on the 2024 aluminum. Comparative results for filiform and salt spray tests are shown in FIGS. 33–39. In all our tests, the appliqués were never equivalent to and typically were better than paint in providing corrosion protection.

We believe that the appliqués can be used on most aerospace metals, including 2024, 6061, 7075, and other aluminum alloys; all titanium alloys; high strength (low carbon) steels like 4130, 4340, and 9310; nickel alloys like INCONEL 718, and magnesium alloys protected with a Dow conversion coating. Our tests have focused on 2024 and 7075 aluminums, which are the standard materials used to assess corrosion protection. In addition, the appliqués can be used on composite structures. At the interface between carbon fiber-reinforced composites and metallic structure, the appliqués reduce galvanic corrosion by reducing access of electrolytes to the metal surfaces. That is, the appliqués seal moisture and aircraft fluids away from the metals (conductors).

The substrates are clad. They can be anodized and treated with a chemical conversion coating, especially a chromated conversion coating like Alodine 600, 1000, or 1200. Our tests with nonchromated primers have shown uneven or poor corrosion protection performance, but the fault lies with the nonchromated primers. We speculate that the primer in these tests is attracting and capturing corrosive agents in contact with the metal surface. We achieve better results by eliminating the primer altogether.

Standard filiform corrosion tests show that the corrosion does not progress from its original state after the corrosion is covered with an appliqué. This fact means that an appliqué over the corrosion can stop minor corrosion pitting.

We conducted rain erosion tests at the Univ. of Dayton for the appliqués and discovered that the best edge seal was filled with chopped fibers to improve its strength and resistance to tearing. We also learned that the appliqués were comparable to or far better than standard coatings. The appliqués provided protection at 500 mph comparable to special rain erosion coatings in some conditions. We noticed delamination between the topcoat and vapor barrier on several test specimens. Lap joints and butt joints had comparable survivability. Tapered edges out performed flat edges. The appliqués appear to provide at least the equivalent protection as paint even without adding a special erosion coating.

In patching areas, it may be desirable to create a butt joint with the vapor barrier layers while cutting back the topcoat. A thinner vapor barrier-topcoat film may fill the area over the vapor barrier where the topcoat is selectively cutaway, as shown in FIG. 45. In this way, a vapor barrier bridges the gap where the adjacent vapor barriers abutt, thereby providing a continuous vapor barrier.

Edges of the appliqués preferably are tapered (FIGS. 40, 41, and 44) to improve aerodynamics.

Repair of the appliqué coating requires cutting through the appliqués, preferably without scribing the underlying substrate. To cut the appliqués, we need a controlled depth, adjustable cutter. Setting the depth of cut and holding that depth is a challenge, especially when working with depths measured in mils (0.001 in). We control depth using a rolling cutter that has a follower wheel to ride on the substrate behind the cut to set the depth of cut.

EXAMPLE 1

The Electrochemical Impedance Spectroscopy (EIS) system we used for our tests included an EG&G Princeton Applied Research (PAR) model 273A potentiostat-galvanostat, a Schlumberger model SI 1260 impedance/gain-phase analyzer, and a personal computer. We then measured appropriate characteristics using the open circuit potential (OCP). EIS measurements applied an alternating voltage of 15 mV for non-painted and 15 and 40 mV for painted specimens, and took measurements over a frequency range of 1.6E-2 to 1.0E+5 Hz with five frequencies, evenly spaced logarithmically, per decade.

The specimens were also tested in PAR model K0235 Flat Cells that included a glass cylinder with three electrodes:

a platinum-clad niobium screen counter the test specimen as the working and a Ag/AgCl/KCl reference electrode (in a central glass well; a Luggin probe, a capillary tube extending nearly to the specimen, is located on one side of the well).

Figure 13:
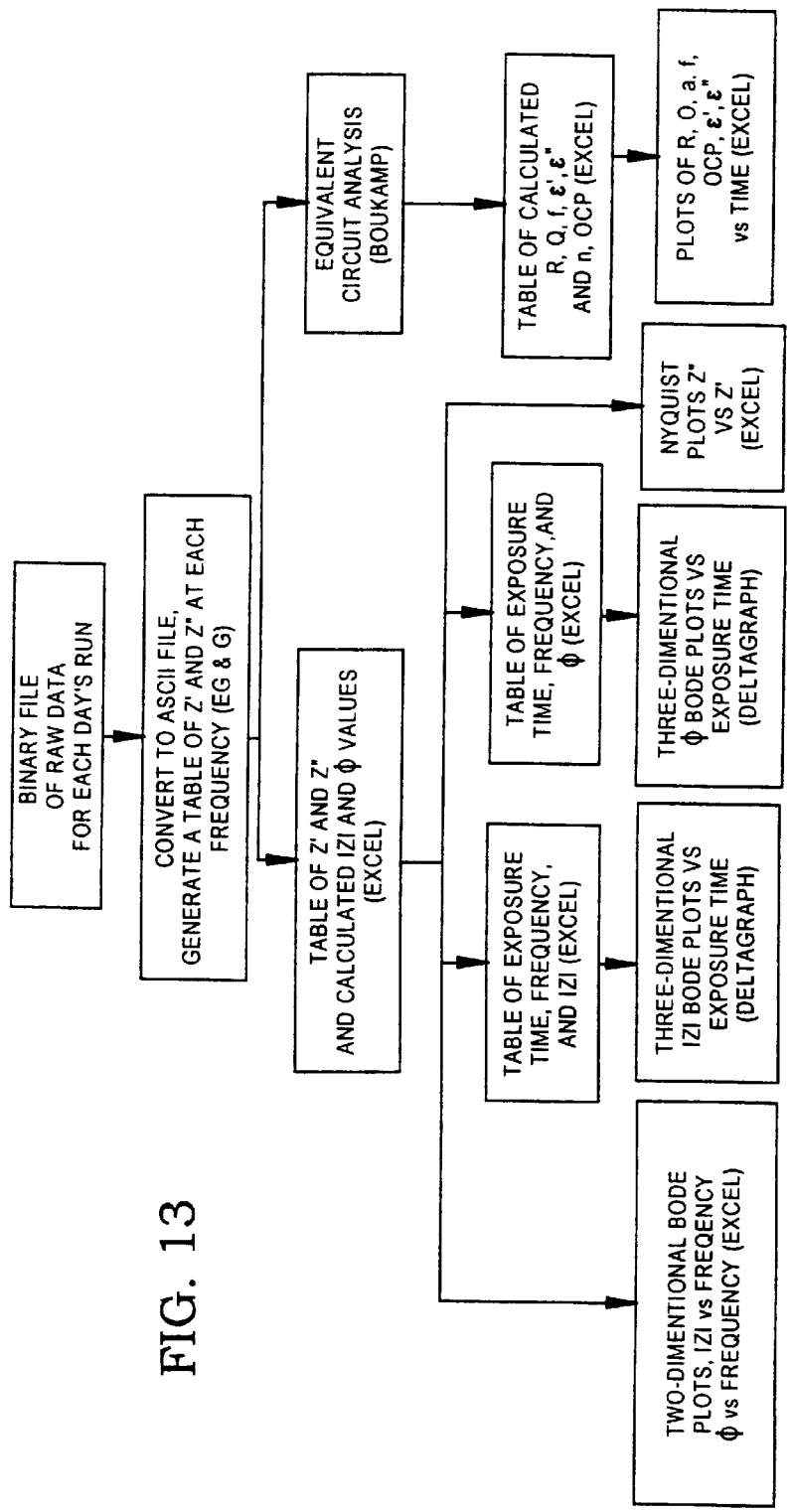
FIG. 13 is a flowchart illustrating how impedance data is used to calculate various corrosion parameters.

The test area was 16 cm². The cell was filled with a fresh 5% NaCl solution for each specimen. For each run, the computer tabulates the real and imaginary components of impedance (Z' and Z", respectively) for each frequency. From this data, we calculate other parameters indicative of corrosion. FIG. 13 is a flowchart showing how we manipulate the impedance data to calculate the desired parameters.

The absolute impedance, |Z| (ohms), for example, is calculated from $$|Z|=\sqrt{(Z')^2+(Z'')^2}$$

and the phase shift, $\phi$ (degrees), is calculated from $$\phi = \frac{180}{\pi}\arctan\frac{Z''}{Z'}.$$

anodization. $R_4$ and $Q_4$ represent the resistance and the capacitance of the primer.

The impedance of a constant phase element (CPE) is defined by $$Z_{CPE} = \frac{1}{Q(j\omega)^n}$$

where

Q is the CPE parameter, $j=\sqrt{-1}$, $\omega$ is angular frequency, and n is the phase coefficient.

Using this definition, the CPE unit is mho·sec$^n$.

When n=0, the CPE unit is mho, which is the inverse unit of resistance (that is, R=1/Q).

When 0<n<1, the CPE unit is "CPE mho" (mho·sec$^n$), which in the SP model is interpreted as a non-ideal capacitance.

When n=1, the CPE unit is mho·sec (farad), which is the unit of capacitance (that is, C=Q).

To validate the SP model, we generated three cases of Bode plots using both the SP model and the five-element model using selected R and C values. For solution resistance, $R_1$=30 ohm-cm². For break frequency, $f_2$=$(2pR_2C_2)^{-1}$ and $f_4$=$(2pR_4C_4)^{-1}$. The cases are summarized in Table 1.

TABLE 1

| | | Corrosion-resistant Metal Substrate | | | Coating | | | |
|---|---|---|---|---|---|---|---|---|
| Case | Rating | $R_2$ (ohm · cm²) | $C_2$ (farad/cm²) | $f_2$ (Hz) | Rating | $R_4$ (ohm · cm²) | $C_4$ (farad/cm²) | $f_4$ (Hz) |
| 1 | Good | 1E+5 | 1E-4 | 0.016 | Good | 1E+6 | 1E-9 | 160 |
| 2 | High | 1E+6 | 1E-5 | 0.016 | Marginal | 1E+5 | 1E-8 | 160 |
| 3 | High | 1E+6 | 1E-6 | 0.160 | Marginal | 3E+5 | 3E-7 | 1.8 |

Bode plots show |Z|·A (ohm·cm², where A is the specimen area, usually 16 cm²) versus frequency and phase shift as functions of the input frequency. We used DeltaGraph® software to generate three-dimensional Bode plots as a finction of exposure time, when appropriate.

Figure 14:
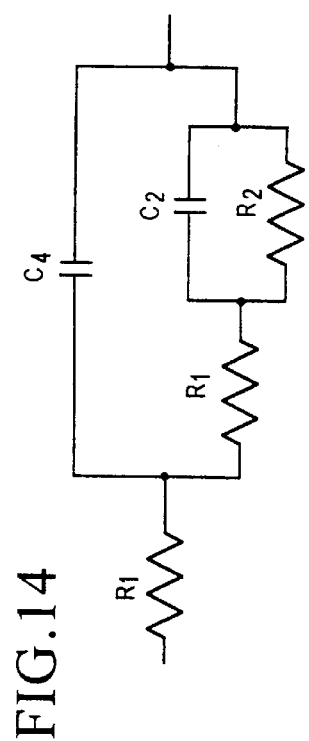
FIG. 14 is a five-element circuit model for EIS analysis.

Boukamp equivalent circuit analysis (ECA) software fits the Z' and Z" data. A five-element-circuit model (FIG. 14) is commonly used. $R_1$ is the solution resistance, $C_4$ is the capacitance of the coating, and $R_4$ is typically called the pore resistance that represents either pinhole defects or other inhomogeneities which provide an electrical short circuit pathway through the coating to the substrate. $C_2$ is the double layer capacitance, and $R_2$ is polarization resistance of the corrosion process occurring beneath the coating, particularly at pinhole defects or other inhomogeneities. In corrosion studies, the polarization resistance is inversely proportional to the corrosion rate of the process; in other words, the higher the polarization resistance, the lower the corrosion rate.

Figure 15:
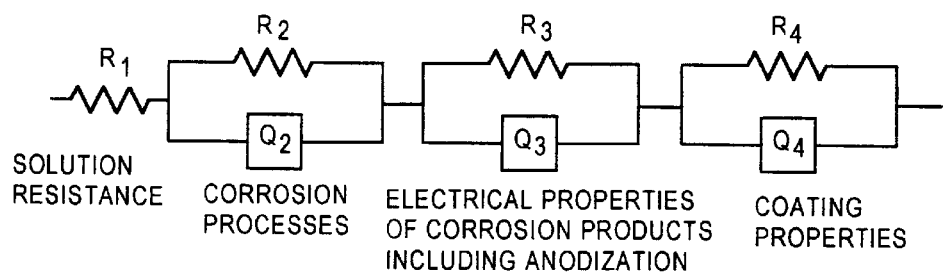
FIG. 15 is a series-parallel circuit model used for EIS analysis in the present invention.
Figure 16:
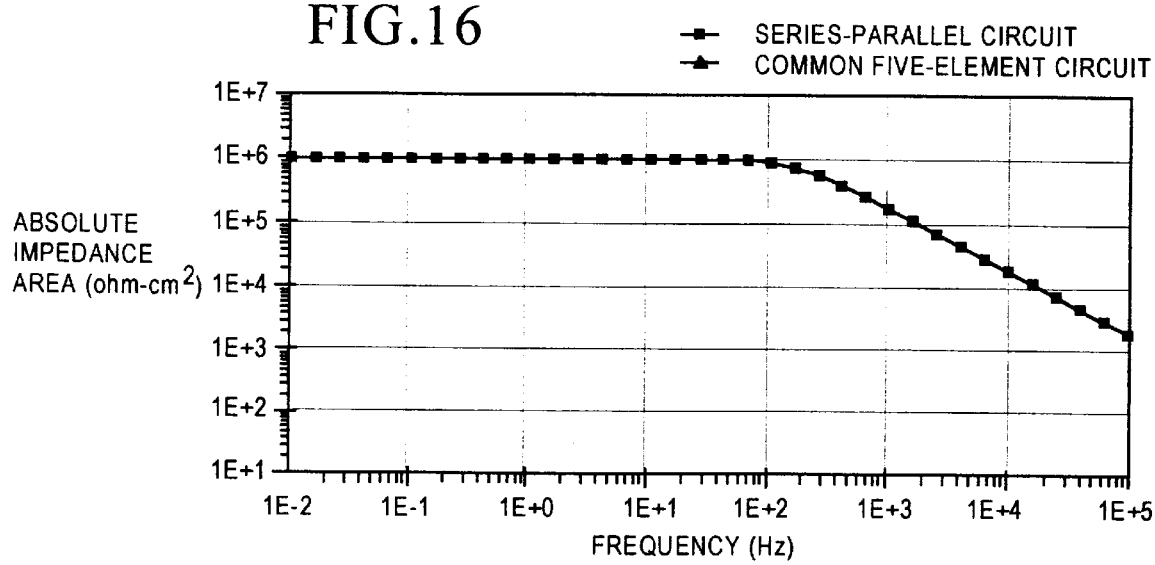
FIGS. 16 and 17 are Bode plots corresponding to Case 1 in Table 1.
Figure 17:
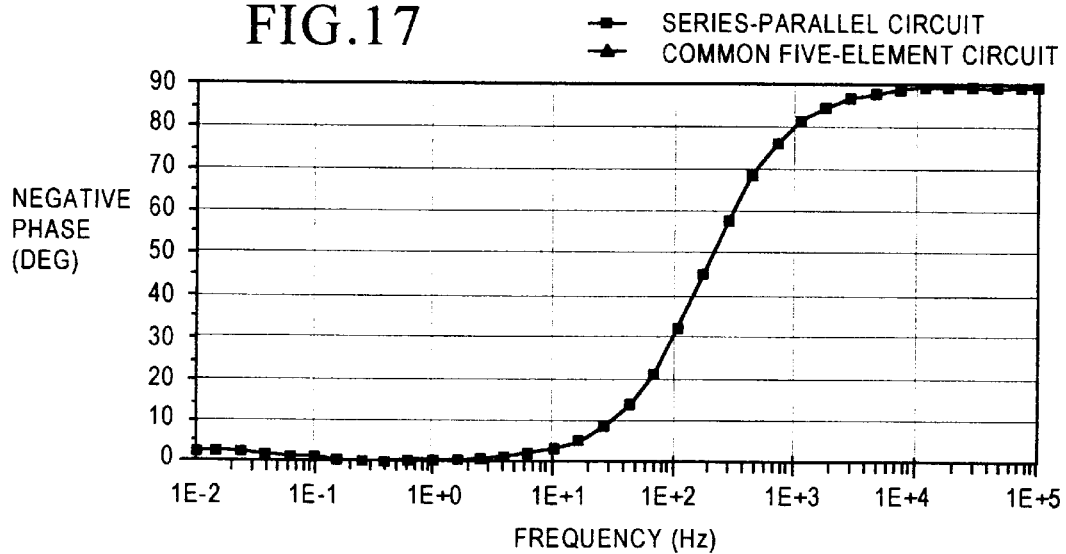
Figure 20:
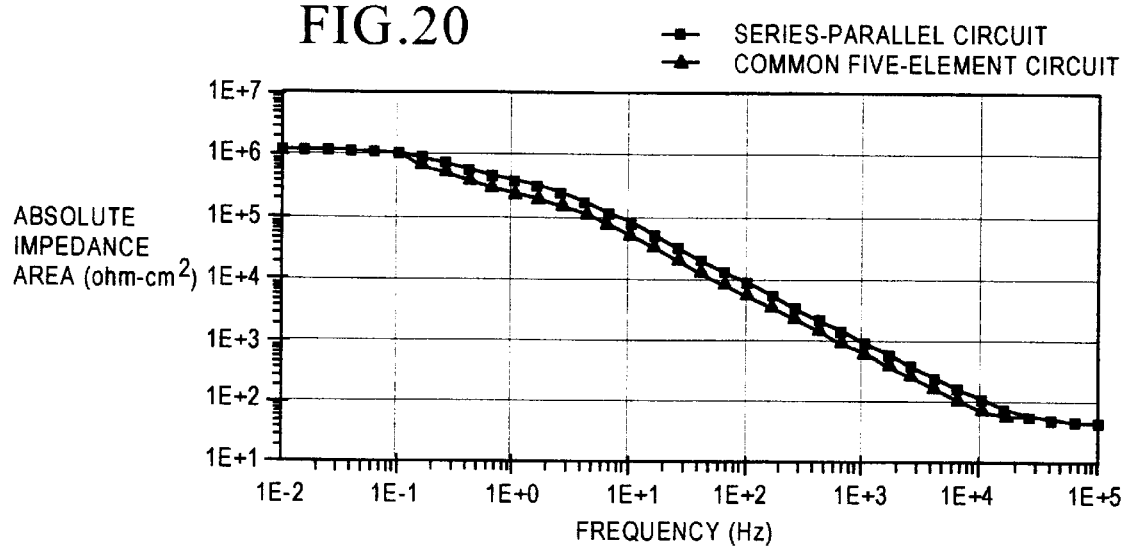
FIGS. 20 and 21 are Bode plots corresponding to Case 3 in Table 1.

FIG. 15 shows the series-parallel (SP) circuit model we used. The R values are resistors and Q values are constant phase elements (CPE). $R_1$ represents the solution resistance. $R_2$ and $Q_2$ represent the polarization resistance and the non-ideal double layer capacitance of the corrosion process, respectively. $R_3$ and $Q_3$ represent the resistance and the non-ideal capacitance of either the corrosion products or the FIGS. 16–21 are Bode plots using the SP and five-element models for the three validation cases. These graphs show the general correspondence between the SP model we selected and the more common five-element circuit model. In Case 1, (FIGS. 16 and 17), the corrosion process is nearly masked by the coating. If either the polarization resistance $R_2$ was lower or the coating resistance $R_4$ was greater, the corrosion process would probably go undetected beneath the coating. The Bode plots from both models are essentially the same. The break frequencies, $f_2$ and $f_4$, differ by four orders of magnitude. In Case 2, (FIGS. 18 and 19), the highly resistive corrosion process is quite evident in the presence of the marginal coating. Again, the Bode plots from both models are essentially the same.

Figure 21:
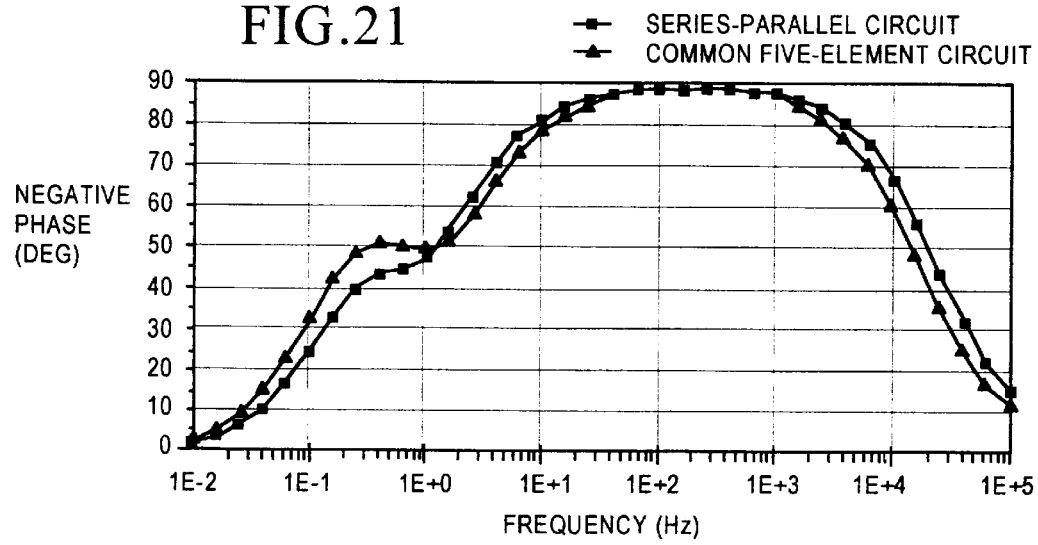
Figure 22:
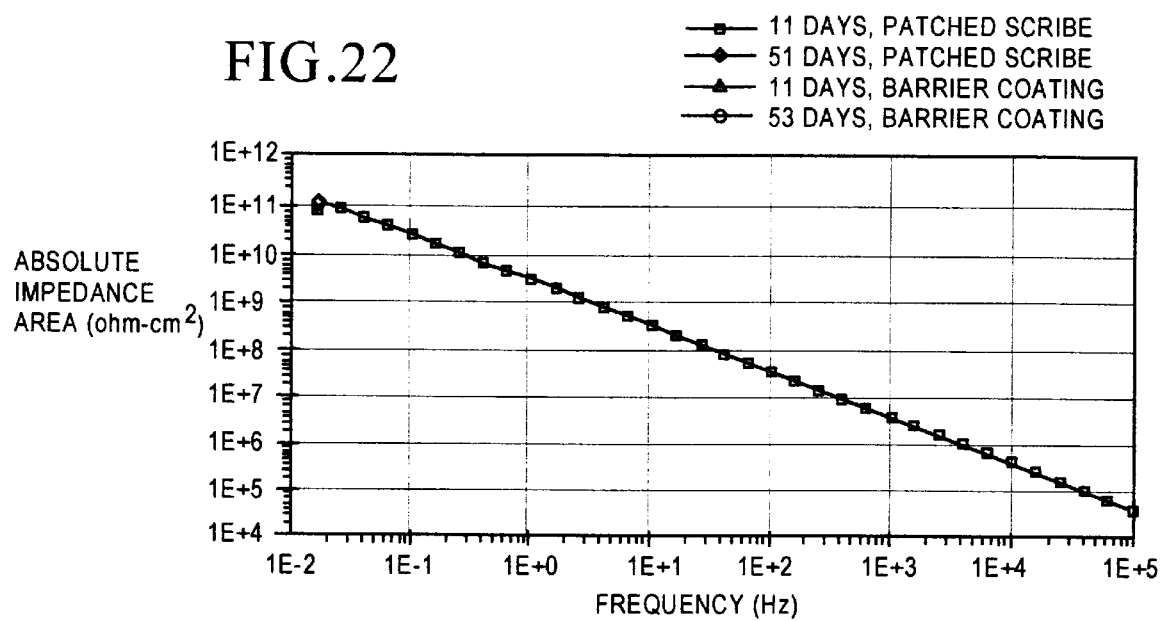
FIGS. 22 and 23 are Bode plots of a preferred appliqué of the present invention showing outstanding corrosion protection as discussed in Example 1.
Figure 23:
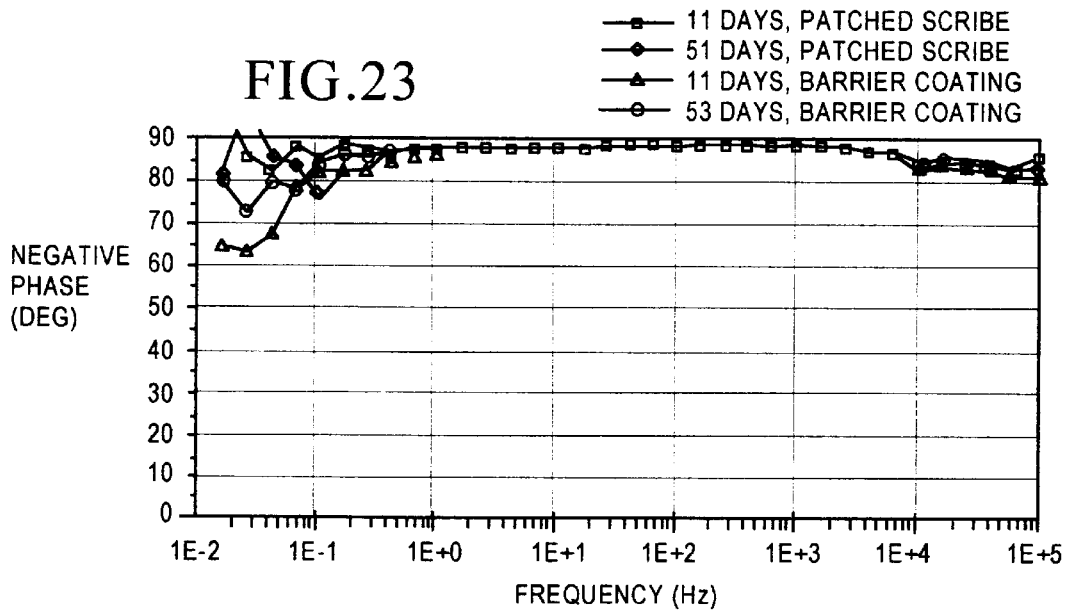

Only in Case 3, (FIGS. 20 and 21), does a difference occur between the two models; the difference is particularly evident in the phase plot (FIG. 21). The magnitudes of the Rs and Cs are the same as the other two cases; the major difference is that the break frequencies, $f_2$ and $f_4$, are within an order of magnitude of each other. When break frequencies are similar, the R and C values will depend on which model is used. The probability of obtaining similar break frequencies as in Case 3 is relatively small in view of the wide range of break frequency values for the various corrosion processes, corrosion products, and coatings. Therefore, the SP model is essentially an equivalent for the five-element circuit model.

Along with the SP model producing similar Bode plots to the common five-element model, the SP model allows the primer, appliqué, topcoat, corrosion products, and corrosion processes to be uniquely separated into individual R and Q elements that can be easily identified, sorted, and monitored with exposure time. Further, the break frequency, $f_{R_iQ_i}$, of each $R_iQ_i$ circuit can be monitored with exposure time. In this study, it is an integer identifying an electrical element, either 1, 2, 3, or 4. Break frequency is an important intrinsic property that is not dependent on surface area. The $f_{R_iQ_i}$ is taken from the time constant, $\tau_{R_iQ_i}$, of the $i^{th}$ parallel $R_iQ_i$ circuit where $$\tau_{R_iQ_i} = (R_iQ_i)^{\frac{1}{n_i}}$$

When the appropriate units are substituted, the $\tau_{R_iQ_i}$ unit is $$(\text{ohm} \cdot \text{mho} \cdot \text{sec}^{n_i})^{\frac{1}{n_i}} = \text{sec}.$$

Since $$\tau_{R_iQ_i} = \frac{1}{\omega_{R_iQ_i}}$$

and $\omega = 2\pi f$, then $$f_{R_iQ_i} = \frac{1}{2\pi(R_iQ_i)^{\frac{1}{n_i}}}$$

A generalization to be used cautiously is that the $f_{R_iQ_i}$ in the range of 1E+1 to 1E+5 Hz is associated with the anodization, corrosion products, and organic coatings such as primer; while an $f_{R_iQ_i}$ in the range of 1E-2 to 1E+1 Hz is associated with corrosion processes.

Once the CPE of the appliqués and coating systems is determined from the ECA, the dielectric constant can be calculated from the following relationship:

$$\varepsilon = \frac{d\, Q^{\frac{1}{n_i}}}{\varepsilon_0}$$

where d is the thickness of the coating and so is the permittivity of free space (8.85E-14 farad/cm).

Fluoropolymer (FP) and polyurethane (PU) appliqués were applied, respectively, to 3-in×6-in panels of clad 2024-T3 Al that were chemical conversion coated with Alodine 600. Prior to the application, at one end of the panel, the surface was scribed with an "×"; the length of the leg from the center point of the × was 0.75 in. The FP appliqué was placed over the × scribe to simulate patching a damaged area: this was not done for the PU appliqué.

Two application methods were used to apply the FP appliqué to the Alodine-treated surface. In the wet application method, the surface is lightly sprayed with water. The FP appliqué is then placed on the surface. The water allows the appliqué to be easily positioned on the surface, and is acceptable provided that care be taken to remove excess water from beneath the appliqué. Otherwise, trapped water will produce bubbles. The PU appliqué, which served as a baseline, was applied using the dry application method. The appliqués were placed over the entire surface including the scribe and was sealed along the edge with a fluoroelastomer to eliminate seepage of the salt solution from the edge.

FIGS. 22–25 show Bode plots of our wet and dry appliqués as a barrier and as a patch over a scribe. These plots are similar to the data presented in FIGS. 3–10. The increase in impedance (|Z|) with decreasing frequency is attributed to the electrical properties (i.e., resistance and capacitance) of the appliqué as a barrier coating. The negative phase of nearly 90 degrees (FIG. 23) shows the very capacitive nature of the appliqué. The patched scribe behaved the same as the barrier. Over the 53 days of exposure, the impedance remained essentially constant except for the slight tapering off at very low frequencies. Retention of the impedance indicates that hardly any corrosion occurred under the appliqués during the duration of the test. The appliqués were among the best treatments available to prevent corrosion.

FIGS. 24 and 25 are Bode plots of our appliqué applied wet as a barrier and as a patch over a scribe. The method of application had no significant effect on the appliqué as a barrier coating to prevent corrosion.

Figure 26:
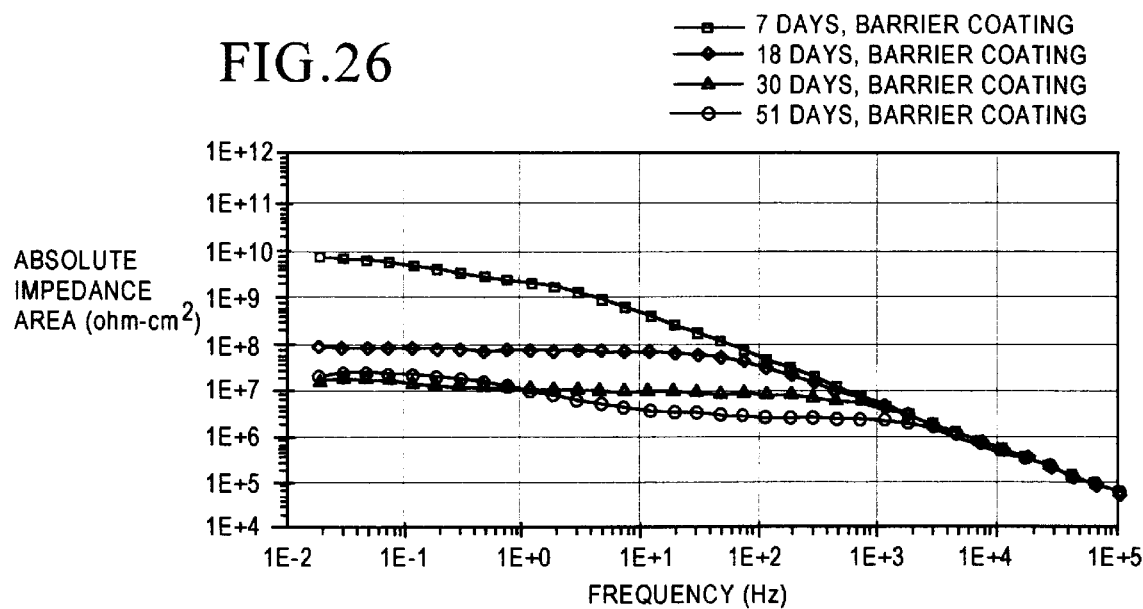
FIGS. 26 and 27 are Bode plots of a polyurethane control appliqué showing the typical performance of appliqué films that fail to function as vapor barriers, as discussed in Example 1.
Figure 27:
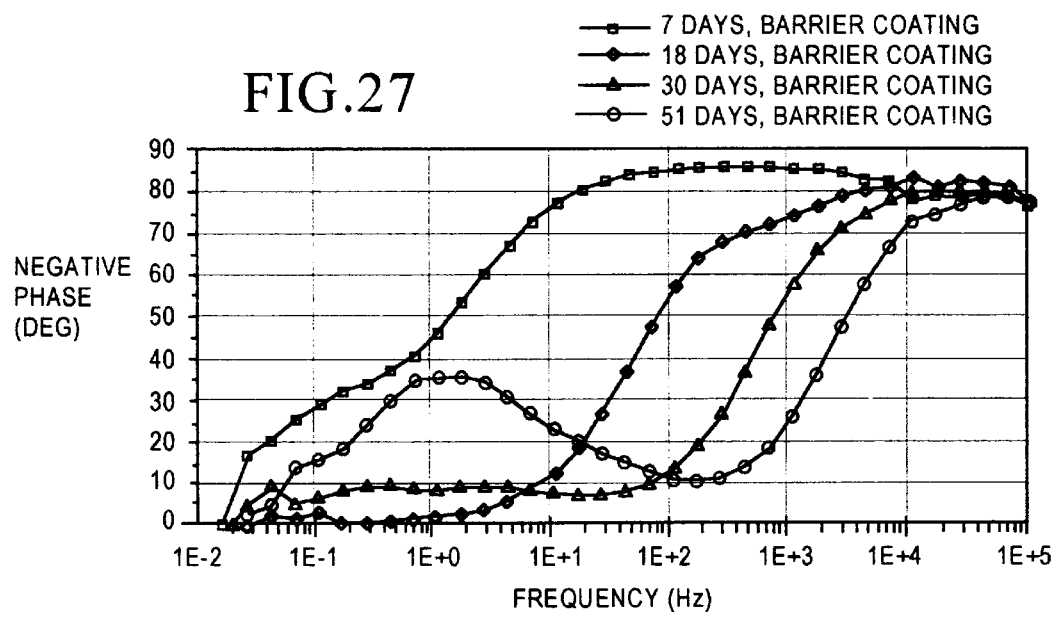

FIGS. 26 and 27 are Bode plots of the polyurethane appliqué control applied dry. At 4 days, the impedance increase with decreasing frequency is attributed to the electrical properties of the appliqué. The smooth increase in impedance begins to reduce at about 10 Hz. The resistance of the coating is lower than our preferred appliqués that function as a vapor barrier. Correspondingly, the negative phase also decreases much sooner. With continued immersion time, the impedance of the coating continues to decrease. A second rise in impedance is observed that is particularly evident in the phase plot. For example, at 51 days, the phase decreases to a minimum at 100 Hz, rises to a maximum, and then decreases to a minimum again. The second increase in the impedance and phase maximum is attributed to corrosion beneath the polyurethane appliqué.

Figure 28:
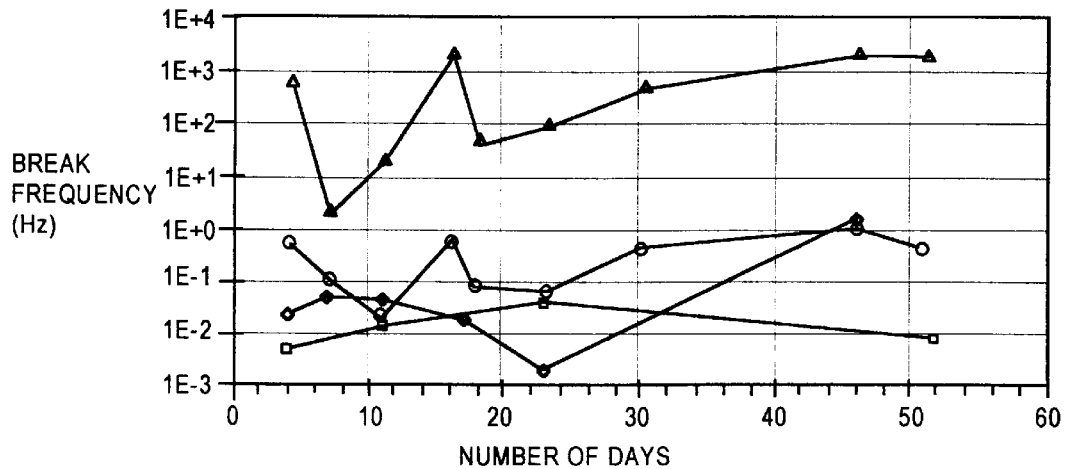
FIG. 28 is a graph of break frequency as a function of time for the appliqué tests of Example 1 showing the superior performance of the appliqués of the present invention.

FIGS. 28–32 show the ECA results (the derived parameters, FIG. 13) of our appliqués that include the break frequency, resistance-area, constant phase element and the n parameter. In FIG. 28, the break frequency for our preferred fluoropolymer appliqué was in the vicinity of IE-2 whereas the break frequency of the polyurethane control was IE+2 Hz. The break frequency for the corrosion occurring beneath the coating was about 5 Hz. The lower break frequency of our preferred fluoropolymer appliqué is attributed to the higher resistance to corrosion. Though much scatter exists in the data, the break frequencies are not significantly dependent on time.

Figure 29:
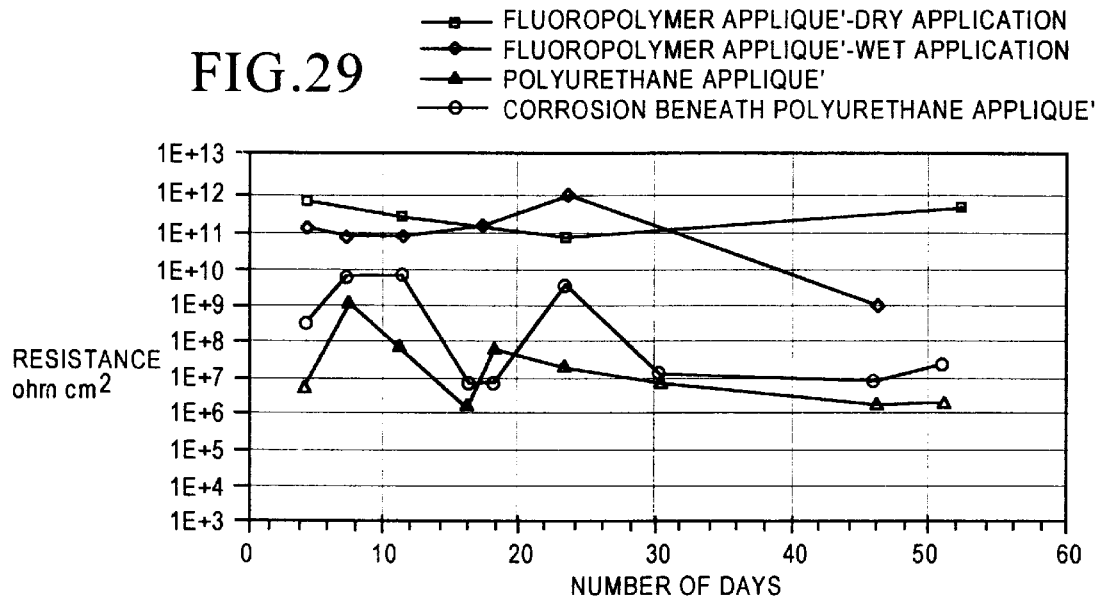
FIG. 29 is a graph of resistance as a function of time for the appliqué tests of Example 1.

In FIG. 29, the resistance (often called the pore resistance) of the FP appliqué is 1E+11 ohm·cm, which is very high for any of the organic coatings commercially available; it is also not dependent on application method. The resistance value for the our appliqué of 1E+7 ohm·cm is more typical of the commercial organic coating systems. The better corrosion resistant barrier coatings will normally have a resistance greater than 1E+7 ohm·cm. Our appliqué has a resistance several orders of magnitude greater than the commercial organic coating systems indicating a very good potential for corrosion barrier applications. In addition, the polarization resistance of the corrosion process beneath the coating is significantly high, which indicates that corrosion is proceeding slowly, if it is occurring at all.

Figure 30:
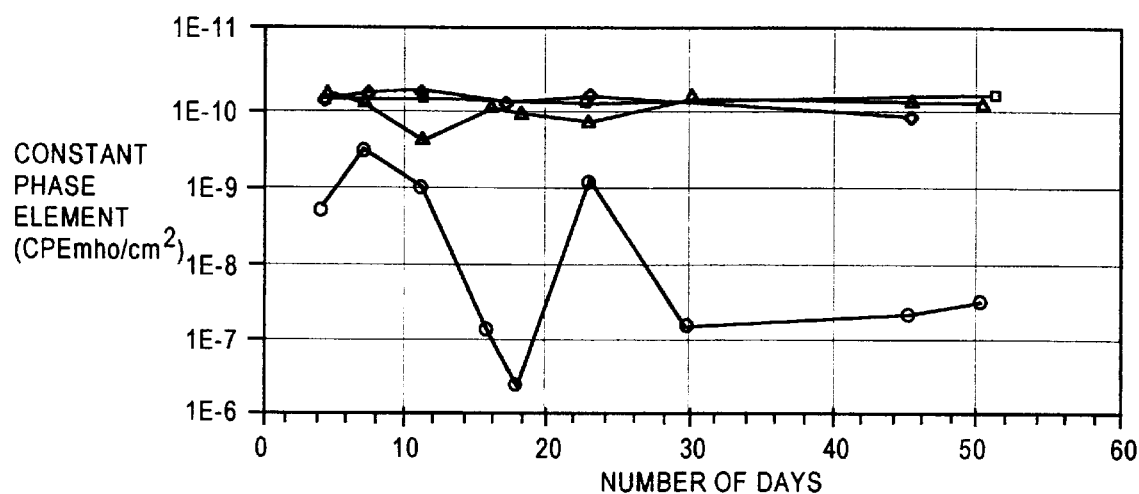
FIG. 30 is a graph of constant phase element (CPE) as a finction of time for the appliqué tests of Example 1.
Figure 31:
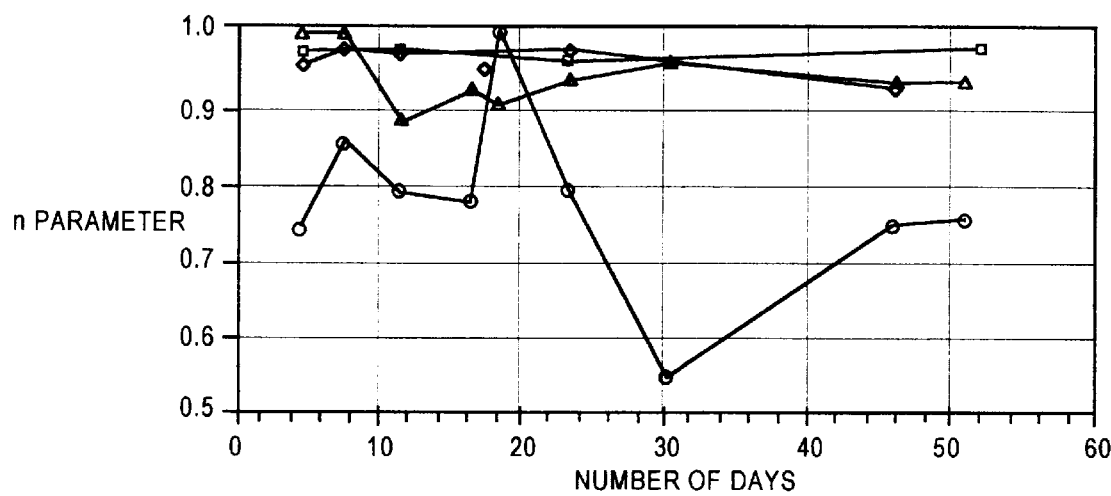
FIG. 31 is a graph of the "n" parameter as a finction of time for the appliqué tests of Example 1.

A very small constant phase element (CPE) of 1E-10 CPE mho/cm$^2$ and "n" parameter of nearly 1.0 shown in FIGS. 30 and 31 represent the capacitance of the appliqués. The CPE value of 1E-6 to 1E-9 CPE mho/cm$^2$ and n parameter of 0.6 to 1.0 represents the non-ideal capacitance of the corrosion process occurring beneath the polyurethane control appliqué. The large scatter for the polyurethane control results from the difficulty in deconvoluting the EIS data in the presence of the impedance high.

Figure 32:
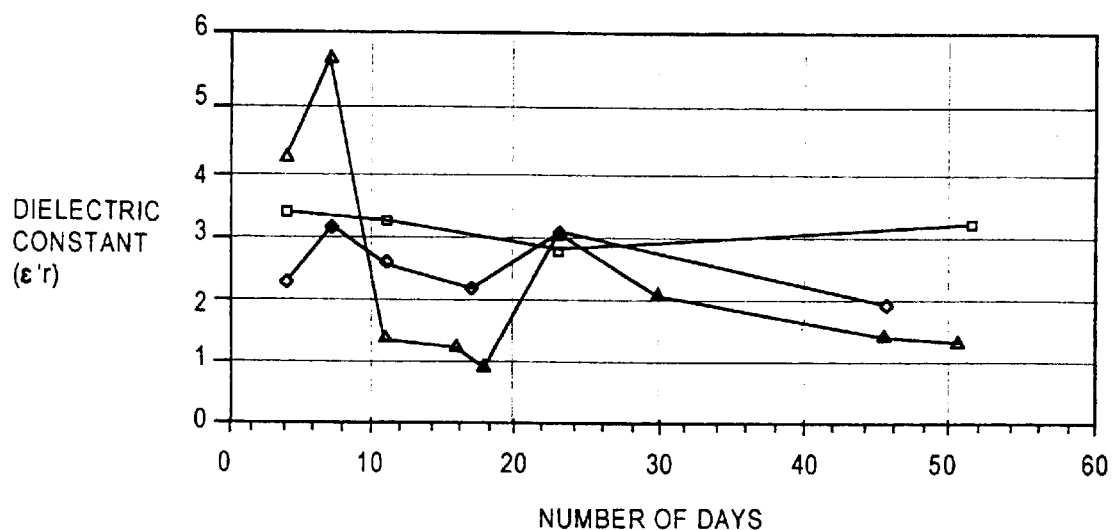
FIG. 32 is a graph of dielectric constant as a function of time for a appliqué tests of Example 1.

FIG. 32 plots the dielectric constant (DE) of the appliqués versus time. The DE for the appliqués magnitude of 2 to 3 is about the same as Teflon®. How the appliqués were applied (wet v. dry) had no significant effect on the DE. The DE of the polyurethane control appliqué is slightly lower than the reported values of 4 to 8. Our preferred appliqués were quite stable while immersed in the salt solution over the test period.

EXAMPLE 2

We also tested our preferred appliqués against a conventional coating used for painting commercial aircraft. For a control, we used a BMS 10-60 polyurethane topcoat over a BMS 10-79 epoxy primer on 3-in×6-in 2024-T3 clad aluminum panel treated with Alodine 600, a chemical conversion coating. The coated panels were exposed to a salt spray environment in accordance with ASTM B117. Periodically, the panels were removed for visual examination and EIS testing.

Figure 46:
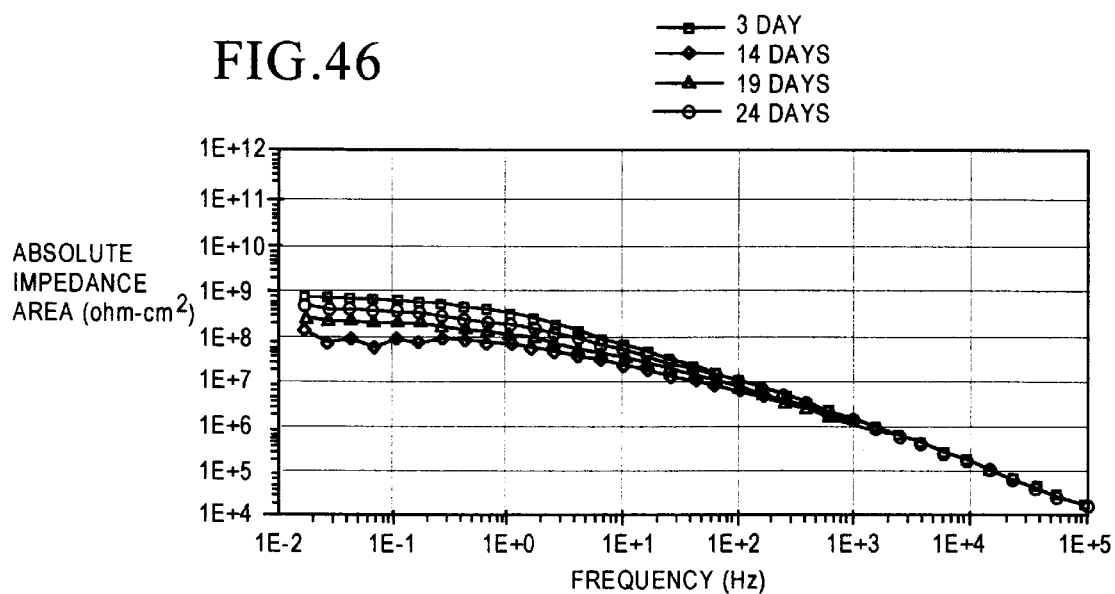
FIGS. 46 and 47 are Bode plots for salt spray tests on a polyurethane coated, epoxy primed, conversion coated clad 2024 T3 aluminum specimen discussed in Example 2.
Figure 47:
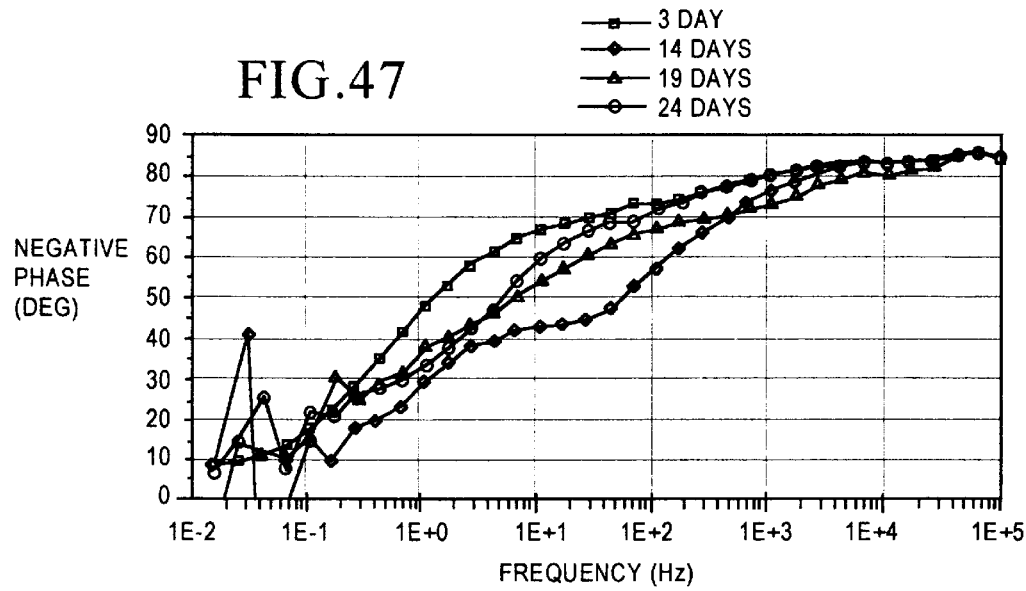

FIGS. 46 and 47 are Bode plots of the painted coating as a function of time up to 24 days. After 5 days of salt spray exposure, the impedance increases with decreasing frequency to about 1 Hz. The increase in impedance begins to taper off. At longer exposure times, the impedance begins to taper off at higher frequencies. The barrier coating resistance decreased with exposure time.

Figure 48:
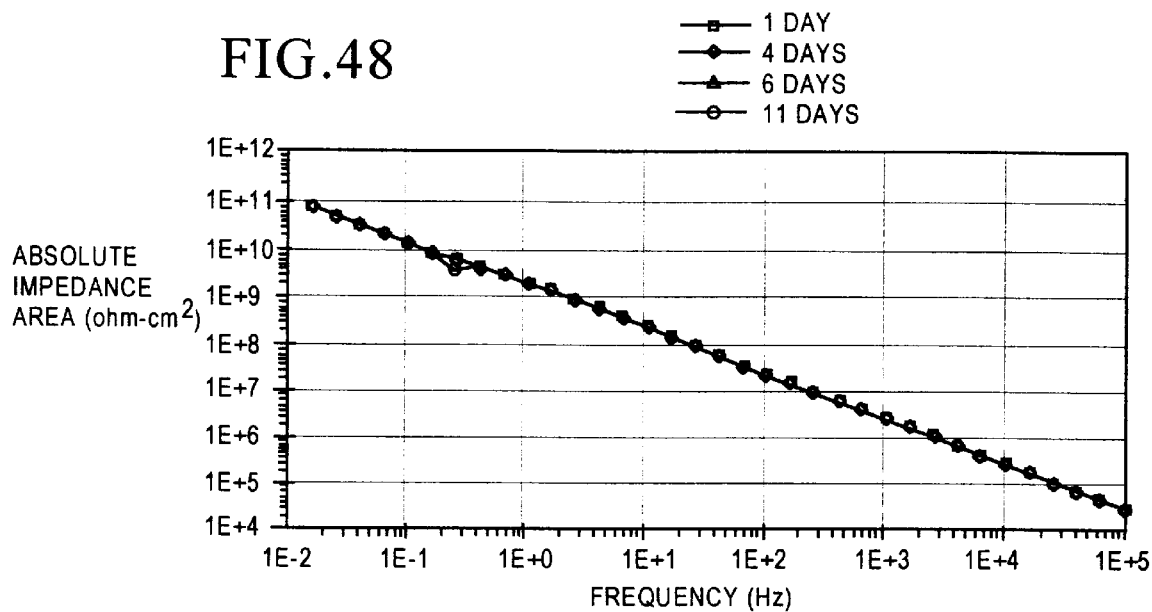
FIGS. 48 and 49 are Bode plots of an appliqué of the present invention in salt spray tests discussed in Example 2.
Figure 49:
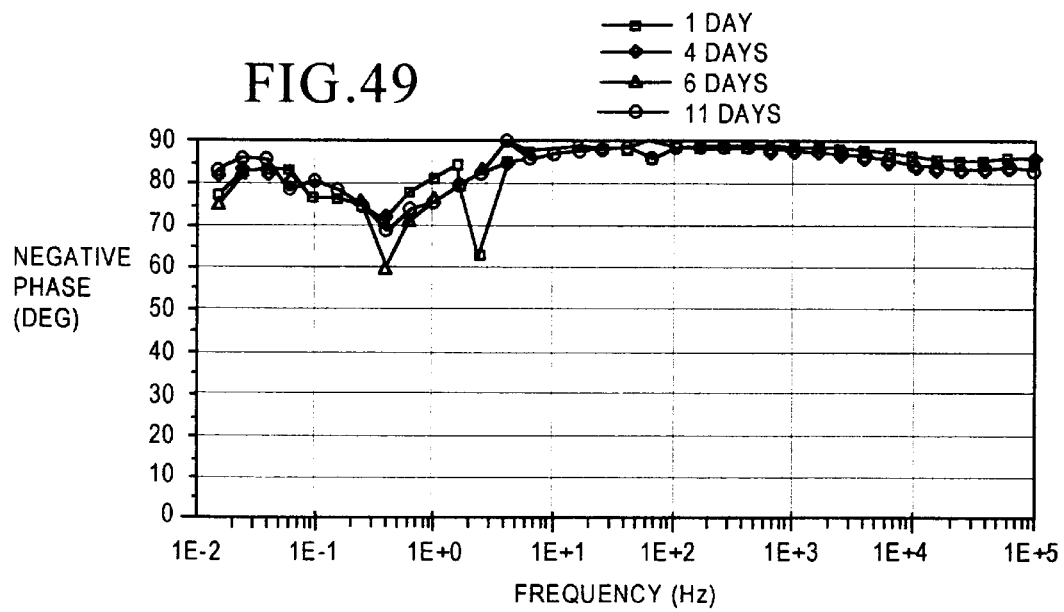

FIGS. 48 and 49 are Bode plots of our appliqué for 11 days of testing. The impedance increased with decreasing frequency. The impedance remained constant. The negative phase of nearly 90 degrees shows the retention of the capacitive nature of the appliqué. In comparison to the painted coating, the appliqué was significantly more resistant to the salt spray exposure, showing essentially no corrosion under our appliqués because the appliqués are a vapor barrier.

While we have described preferred embodiments, those skilled in the art will readily recognize alterations, variations, and modifications that might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A corrosion protection appliqué adapted for applying to an aircraft surface as a substantially complete, bubble-free, wrinkleless coating to replace aerospace paint on the surface, and, in replacing the paint, to provide corrosion protection for the surface by limiting migration of water from a surrounding atmosphere to the surface, the appliqué comprising a 1–4 mil thick, water vapor barrier stable in hot-wet conditions up to at least 250° F. and selected from a fluorinated terpolymer derived from tetrafluoroethylene, hexafluoropropylene, and vinylidene fluoride or a fluoropolymer, the vapor barrier being adapted to substantially reduce or to eliminate transport of water to the surface and a pressure-sensitive or thermally-activated adhesive having low electrolytic, ion transporting properties to enhance corrosion protection by limiting ion transport beneath the vapor barrier, the adhesive being applied on at least one face of the vapor barrier over substantially the entire face for adhering the vapor barrier to the surface, the vapor barrier being tearable and tatterable in the event that the appliqué begins to peel during flight and being adapted to provide sufficient corrosion protection to replace aerospace paint as a corrosion protection covering or coating for the surface.

2. The appliqué of claim 1 further comprising a fluoroelastomer topcoat over the vapor barrier; the topcoat being stable in hot-wet conditions up to at least 250° F., providing color and gloss through pigments dispersed in the fluoroelastomer, and being markable so that removable indicia can be imprinted on the topcoat.

3. A corrosion protection appliqué for applying a substantially complete, bubble-free, wrinkleless coating as a replacement for aerospace paint to a surface to provide corrosion protection to an aircraft by limiting migration of water from a surrounding atmosphere to the surface, comprising a 1–4 mil thick, water vapor barrier selected from a fluorinated terpolymer or a fluoropolymer to substantially reduce or to eliminate transport of water to the surface and an adhesive having low electrolytic, ion transporting properties to enhance corrosion protection, the adhesive being applied on at least one face of the vapor barrier over substantially the entire face for adhering the vapor barrier to the surface, the vapor barrier being tearable and tatterable in the event that the appliqué begins to peel during flight, the appliqué being adapted to replace aerospace paint as a covering or coating for an article wherein the vapor barrier is metallized on one face.

4. The appliqué of claim 3 molded to have substantially one Gaussian curvature along one axis while a varying curvature along a transverse axis.

5. The appliqué of claim 3 further comprising a fluoroelastomer topcoat over the water vapor barrier wherein the topcoat includes an anti-static layer by dispersing carbon or graphite fibers in the fluoroelastomer.

6. The appliqué of claim 3 wherein the terpolymer is derived from tetrafluoroethylene, hexafluoropropylene, and vinylidine fluoride.

7. The appliqué of claim 3 wherein the adhesive is applied to the metallized surface.

8. An appliqué suitable as a replacement for aerospace paint, comprising:
   (a) an acrylic, pressure-sensitive adhesive;
   (b) a vapor barrier film made from a terpolymer derived from tetrafluoroethylene, hexafluoropropylene, and vinylidene fluoride coated with the adhesive on one side;
   (c) a fluoroelastomer attached to the terpolymer to form a multi-layer composition;
   (d) at least one pigment to provide color and gloss dispersed in the terpolymer, fluoroelastomer, or both; and
   (e) anti-static additives dispersed in the fluoroelastomer wherein the appliqué is tearable and tatterable and is stable in hot-wet conditions up to about 250° F.

9. The appliqué of claim 8 further comprising single or double transfer protective paper attached to the appliqué.

10. The appliqué of claim 8 wherein the film is metallized.

11. An appliqué coating system for replacing conventional paints on a metal or composite aerospace part or assembly without introducing a significant weight penalty while simplifying replacement and resealing in comparison to paint, comprising:
   (a) a 1–4 mil thick, metallized vapor barrier stable in hot-wet conditions up to at least 250° F. interfacing in a predetermined area with the part or assembly; the vapor barrier being adapted to provide corrosion protection to the part or assembly by limiting migration of water to the part or assembly while remaining peelable; and
   (b) an adhesive on the predetermined area for temporarily adhering the vapor barrier to the part while permitting removal of the vapor barrier.

12. The system of claim 11 further comprising a polymeric, fluoroelastomer topcoat stable in hot-wet conditions up to at least 250° F. over the vapor barrier wherein at least one of the topcoat and the vapor barrier includes an effective amount of at least one pigment to provide color, gloss, or at least one other predetermined physical or chemical property to the system.

13. A part coated with the system of claim 11.

14. A chromate-free, paintless coating system to replace aerospace paint systems on clad aluminum aircraft surfaces while providing corrosion protection to the surfaces, comprising:

on an aircraft
   (a) a clad aluminum substrate having a surface;
   (b) a substantially continuous acrylic adhesive on the surface covering an area of interest; the adhesive having low electrolytic, ion transporting properties to enhance corrosion protection;
   (c) a 1–4 mil thick vapor barrier of fluorinated terpolymer derived from tetrafluoroethylene, hexafluoropropylene, and vinylidene fluoride and stable in hot-wet conditions up to at least 250° F., the vapor barrier essentially covering the area of interest over the adhesive to limit migration of water to the surface;
   (d) optionally, a topcoat including anti-static additives, adhered over the vapor barrier; and
   (e) at least one pigment dispersed in the vapor barrier, the topcoat, or both to provide color and gloss,
wherein the vapor barrier provides at least equivalent corrosion protection to that protection afforded clad Al 2024 coated with paint, a chromated conversion coating, and a chromated primer.

15. The paintless coating system of claim 14 wherein the anti-static topcoat is used to form an adhesive-vapor barrier-topcoat multilayer film and wherein the topcoat includes a fluoroelastomer stable in hot-wet conditions up to at least 250° F.

16. A method for providing corrosion protection to an aircraft surface, comprising the step of:
   applying a plurality of appliqués of the type defined in claim 1 to the aircraft surface without disbonds, the plurality of appliqués being sealed to form a vapor barrier to substantially reduce or to eliminate transport of water to the surface.

17. A corrosion protected surface obtained by the method of claim 16.

18. A method for replacing conventional painted coatings on metal or composite aerospace parts or assemblies with a replaceable, resealable protective covering, comprising the step of:
   (a) cutting gores of a terpolymer derived from tetrafluoroethylene, hexafluoropropylene, and vinylidene fluoride vapor barrier film stable in hot-wet conditions up to at least 250° F. into a plurality of appliqués suitable for covering a predetermined surface of the part;
   (b) adhering the gores to the part on the surface; and
   (c) sealing between the gores to provide a continuous vapor barrier from a plurality of gores between the part and its environment;
wherein the adhered gores provide at least equivalent corrosion protection to that protection afforded clad Al 2024 coated with paint, a chromated conversion coating, and a chromated primer.

19. The method of claim 18 wherein the vapor barrier includes at least one overlying organic matrix resin topcoat stable in hot-wet conditions up to at least 250° F.

20. The method of claim 19 wherein the topcoat, vapor barrier, or both includes at least one pigment, plasticizer, extender, antioxidant, ultraviolet light stabilizer, dye, emissivity agent, fiber reinforcement, or mixtures thereof.

21. The method of claim 18 wherein the vapor barrier is stable in hot-wet conditions up to at least 250° F. and is tearable and tatterable.

22. A method for sealing adjacent appliqués on a substrate, comprising the step of:
   applying fluoroelastomer topcoat stable in hot-wet conditions up to at least 250° F. to a seam between the adjacent appliqués to bind the appliqués together.

23. The method of claim 22 wherein the appliqué includes a terpolymer derived from tetrafluoroethylene, hexafluoropropylene, and vinylidene fluoride stable in hot-wet conditions up to at least 250° F.

24. A method for sealing adjacent polymeric film appliqués on a substrate to achieve an essentially continuous vapor barrier for a covered area, comprising the steps of:
   (a) defining a seam by positioning two positioned, polymeric film appliqués abutting on a substrate adjacent one another, each appliqué including a vapor barrier made from a polymer;
   (b) applying a sealing appliqué tape strip having a vapor barrier along the seam over the positioned appliqués to form a lap joint between the sealing appliqué and the positioned appliqués; and
   (c) optionally, sealing edges of the sealing appliqué with polymer to bind the sealing appliqué to the positioned appliqués.

25. A method for essentially stopping the progress of corrosion at a site on an aircraft, comprising the step of:
   applying a metallized vapor barrier comprising a terpolymer derived from tetrafluoroethylene, hexafluoropropylene, and vinylidene fluoride in the form of an appliqué with an adhesive having poor properties as an electrolyte over the site to eliminate transport of water from the surrounding atmosphere to the site, thereby essentially stopping progress of corrosion at the site.

26. A method for reducing migration of water into a honeycomb core of a composite honeycomb sandwich panel, comprising the step of:
   adhering a 1–4 mil vapor barrier comprising a fluorinated terpolymer derived from tetrafluoroethylene, hexafluoropropylene and vinylidene fluoride to a face sheet of the panel to reduce or to eliminate transport of water through the face sheet to the core.

* * * * *